US012523907B2

United States Patent
Ye et al.

(10) Patent No.: US 12,523,907 B2
(45) Date of Patent: Jan. 13, 2026

(54) WIDE COLOR GAMUT ENABLED EDGE-LIT BLU FOR HIGH PPI VR-LCD DISPLAY

(71) Applicant: Meta Platforms Technologies, LLC, Menlo Park, CA (US)

(72) Inventors: Shenglin Ye, Santa Clara, CA (US); Xinyu Zhu, San Jose, CA (US); Rungrot Kitsomboonloha, Los Gatos, CA (US); Cheonhong Kim, Mountain View, CA (US); Sascha Hallstein, Saratoga, CA (US); Wook Jin Han, Sunnyvale, CA (US); Ruiqing Ma, Kirkland, WA (US); Xiangtong Li, San Jose, CA (US); Yu-Jen Wang, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/590,840

(22) Filed: Feb. 28, 2024

(65) Prior Publication Data
US 2024/0310677 A1    Sep. 19, 2024

Related U.S. Application Data

(60) Provisional application No. 63/451,922, filed on Mar. 13, 2023.

(51) Int. Cl.
*G02F 1/1335* (2006.01)
*F21V 8/00* (2006.01)
*G02F 1/13357* (2006.01)

(52) U.S. Cl.
CPC ..... *G02F 1/133614* (2021.01); *G02B 6/0053* (2013.01); *G02F 1/133528* (2013.01); *G02F 1/133621* (2013.01); *G02F 1/133615* (2013.01)

(58) Field of Classification Search
CPC ......... G02F 1/133614; G02F 1/133528; G02F 1/133621; G02F 1/133615;
(Continued)

(56) References Cited

U.S. PATENT DOCUMENTS

| 2015/0109814 A1 | 4/2015 | Chen et al. |
| 2016/0070137 A1 | 3/2016 | You et al. |

(Continued)

FOREIGN PATENT DOCUMENTS

| CN | 108107496 A | 6/2018 |
| CN | 114624799 A | 6/2022 |

OTHER PUBLICATIONS

Derlofske J. V., et al., "3M™ Quantum Dot Enhancement Film (QDEF)," Software, Electronics, and Mechanical Systems Laboratory, 2013, 12 pages.

(Continued)

*Primary Examiner* — Mariam Qureshi
(74) *Attorney, Agent, or Firm* — Greenberg Traurig, LLP

(57) ABSTRACT

A liquid crystal display panel for near-eye display comprises a liquid crystal (LC) panel and a backlight unit (BLU). The BLU includes an array of blue light-emitting diodes (LEDs); a light guide plate configured to guide the blue light from the array of blue LEDs through total internal reflection, and couple portions of the blue light guided by the light guide plate out of the light guide plate; a quantum dot film including quantum dots configured to absorb blue light and emit red and green light; a brightness enhancement film configured to transmit incident light within an angular range and reflect incident light outside of the angular range; and an optical efficiency enhancement film configured to modify an angular beam profile of light from the quantum dot film such (Continued)

that the light transmitted by the brightness enhancement film has a peak intensity in a direction perpendicular to the LC panel.

18 Claims, 15 Drawing Sheets

(58) Field of Classification Search
CPC .......... G02F 1/133607; G02F 2202/36; G02B 6/0053; G02B 5/045
See application file for complete search history.

(56) References Cited

U.S. PATENT DOCUMENTS

| 2017/0023720 | A1* | 1/2017 | Wang | G02B 6/005 |
|---|---|---|---|---|
| 2018/0292591 | A1* | 10/2018 | Rao | G02B 6/005 |
| 2020/0407627 | A1* | 12/2020 | Zhou | C09K 11/883 |
| 2022/0043307 | A1 | 2/2022 | Walker et al. | |
| 2023/0082737 | A1* | 3/2023 | Lee | G02B 30/34 |
| | | | | 359/630 |
| 2023/0194926 | A1* | 6/2023 | Boyd | G02F 1/133603 |
| | | | | 349/62 |
| 2024/0045270 | A1* | 2/2024 | Sun | G02F 1/133536 |
| 2024/0210755 | A1* | 6/2024 | Yang | G02F 1/133606 |

OTHER PUBLICATIONS

European Search Report for European Patent Application No. 24162450.1, dated Jul. 19, 2024, 11 pages.

\* cited by examiner

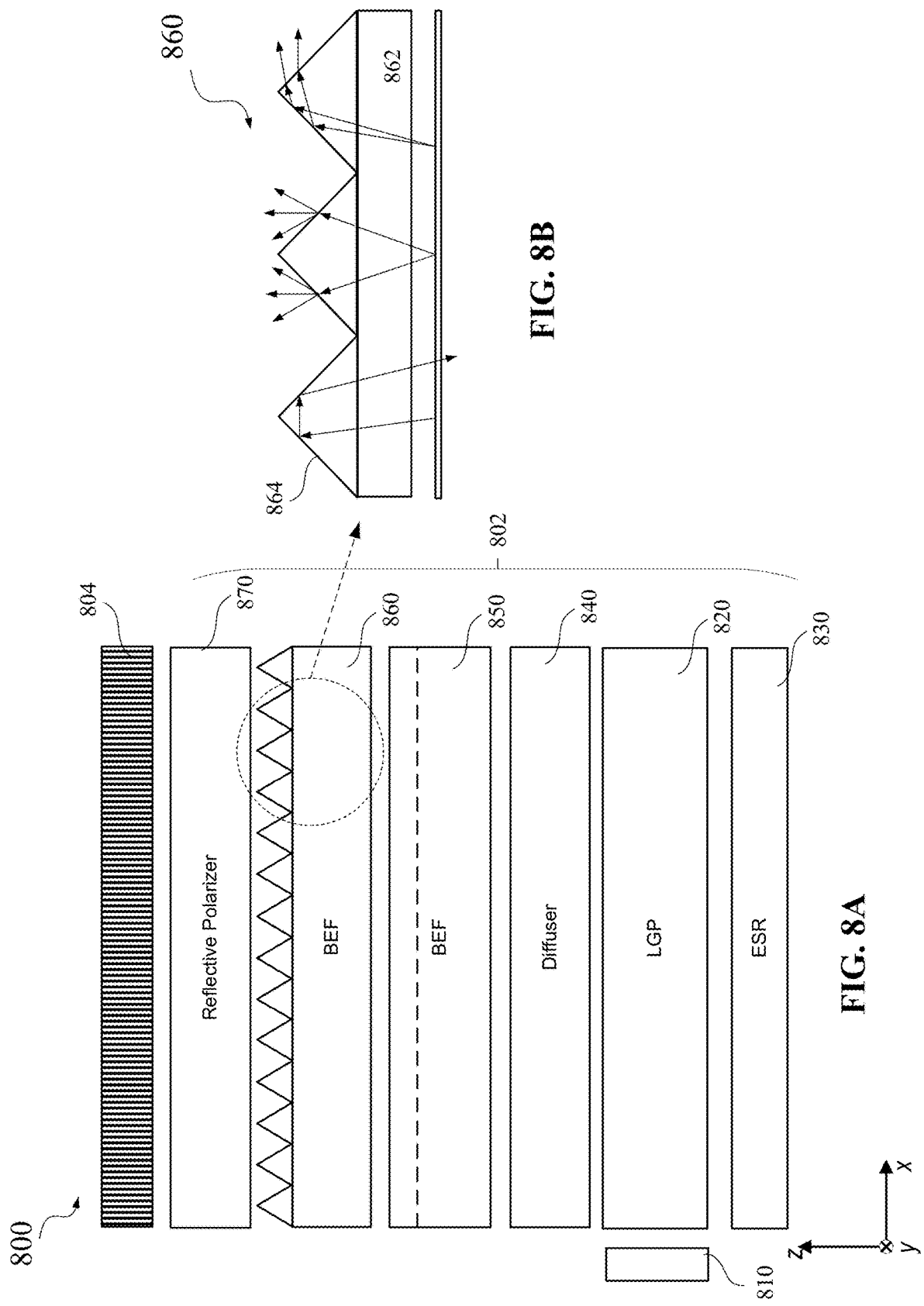

| | | White LED | Blue LED + QD film | |
|---|---|---|---|---|
| BLU | LED | 450 nm | 445 nm | 445 nm |
| | QD | N/A | DCI QD 80 μm | DCI QD 130 μm |
| | R_peak | | 451 nm | 451 nm |
| | G_Peak | | 536 nm | 533 nm |
| | B_peak | | 627 nm | 635 nm |
| | FWHM_H | ~40° | 40.5° | 40° |
| | FWHM_V | ~42° | 43° | 42° |
| Color filter | Type | sRGB | sRGB | DCI-P3 | sRGB | DCI-P3 |
| | Thickness | 1.8 μm | 1.8 μm | 2.3 μm | 1.8 μm | 2.3 μm |
| DCI-P3 coverage | | 75.10% | 89.10% | 98.90% | 84.00% | 97.60% |

FIG. 15

WIDE COLOR GAMUT ENABLED EDGE-LIT BLU FOR HIGH PPI VR-LCD DISPLAY

CROSS-REFERENCE TO RELATED APPLICATION

This application claims the benefit of and priority to U.S. Provisional Application No. 63/451,922, filed Mar. 13, 2023, entitled "WIDE COLOR GAMUT ENABLED EDGE-LIT BLU FOR HIGH PPI VR-LCD DISPLAY," which is herein incorporated by reference in its entirety.

BACKGROUND

An artificial reality system, such as a head-mounted display (HMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. A near-eye display generally includes an optical system configured to form an image of a computer-generated image on an image plane. The optical system of the near-eye display may relay the image generated by an image source (e.g., a display panel) to create a virtual image that appears to be away from the image source and further than just a few centimeters away from the user's eyes.

SUMMARY

This disclosure relates generally to liquid crystal displays (LCDs). More specifically, and without limitation, techniques disclosed herein relate to improving the color gamuts and efficiencies of edge-lit backlight units (BLU)s for high-resolution LCD display panels for near-eye display. Various inventive embodiments are described herein, including devices, systems, methods, structures, materials, processes, and the like.

According to certain embodiments, a liquid crystal display panel may include a liquid crystal (LC) panel and a BLU. The BLU may include an array of blue light-emitting diodes (LEDs); a light guide plate configured to receive blue light from the array of blue LEDs, guide the blue light through total internal reflection, and couple portions of the blue light guided by the light guide plate out of the light guide plate; a quantum dot film including quantum dots configured to absorb blue light and emit red and green light; a brightness enhancement film configured to transmit incident light within an angular range and reflect incident light outside of the angular range; and an optical efficiency enhancement film between the quantum dot film and the brightness enhancement film, the optical efficiency enhancement film configured to modify an angular beam profile of light from the quantum dot film such that the light transmitted by the brightness enhancement film has a peak intensity in a direction perpendicular to the LC panel.

In some embodiments of the liquid crystal display panel, the optical efficiency enhancement film may include prisms, pyramids, negative pyramids, truncated pyramids, hemi-spheres, waffle, or a combination thereof. In some embodiments, the optical efficiency enhancement film may include prisms on one side and pyramids on an opposing side. The quantum dot film may include a first barrier layer, a second barrier layer, and a quantum dot matrix material layer between the first barrier layer and the second barrier layer, the quantum dot matrix material layer including the quantum dots dispersed in a polymer matrix. In some embodiments, the quantum dots may include nanoparticles of a first size and configured to absorb blue light and emit red light, and nanoparticles of a second size and configured to absorb blue light and emit green light. The quantum dot film may also include micro-structures configured to diffuse light.

In some embodiments of the liquid crystal display panel, the brightness enhancement film may include a first film including a first array of prisms arranged along a first direction, each prism of the first array of prisms extending in a second direction; and a second film including a second array of prisms arranged along the second direction, each prism of the second array of prisms extending in the first direction. In some embodiments, the backlight unit may further comprise a reflector film, the light guide plate may be between the reflector film and the quantum dot film, and the reflector film may be configured to reflect incident light towards the light guide plate and the quantum dot film. In some embodiments, the backlight unit may include a reflective polarizer between the LC panel and the brightness enhancement film, the reflective polarizer configured to transmit light of a first polarization state and reflect light of a second polarization state that is orthogonal to the first polarization state. In some embodiments, the reflective polarizer may be coupled to the LC panel. In some embodiments, the array of blue LEDs may be at an edge of the light guide plate. In one example, a thickness of the quantum dot film is less than about 60 μm, and a thickness of the optical efficiency enhancement film is less than about 100 μm.

According to certain embodiments, an LCD panel may include an LC panel and a BLU. The BLU may include an array of blue light-emitting diodes (LEDs); a light guide plate configured to receive blue light from the array of blue LEDs, guide the blue light through total internal reflection, and couple portions of the blue light guided by the light guide plate out of the light guide plate; a brightness enhancement film configured to transmit incident light within an angular range and reflect incident light outside of the angular range; and a hybrid film between the light guide plate and the brightness enhancement film. The hybrid film may include a quantum dot film including quantum dots dispersed in a polymer matrix; a first coating layer between the quantum dot film and the light guide plate and including an array of prisms; and a second coating layer between the quantum dot film and the brightness enhancement film and including micro-structures, where the first coating layer and the second coating layer may be configured to tune an angular beam profile of light emitted from the hybrid film such that the light transmitted by the brightness enhancement film has peak intensity in a direction perpendicular to the LC panel.

In some embodiments of the LCD panel, the micro-structures may include pyramids, negative pyramids, truncated pyramids, hemi-spheres, a waffle, or a combination thereof. The quantum dots may include nanoparticles of a first size and configured to absorb blue light and emit red light, and nanoparticles of a second size and configured to absorb blue light and emit green light. The brightness enhancement film may include a first film including a first array of prisms arranged along a first direction, each prism of the first array of prisms extending in a second direction; and a second film including a second array of prisms arranged along the second direction, each prism of the second array of prisms extending in the first direction. In some embodiments, the backlight unit may include a reflector film, the light guide plate may be between the reflector film and the quantum dot film, and the reflector film may be configured to reflect incident light towards the light guide plate and the hybrid film. In some embodiments, the backlight unit may include a reflective polarizer between the LC panel and the brightness enhancement film, the reflective polarizer configured to transmit light of a first polarization state and reflect light of a second polarization state that is orthogonal to the first polarization state. A thickness of the hybrid film may be less than about 100 μm. The LC panel may be characterized by a resolution greater than about 600 pixels per inch.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 8A illustrates an example of a backlight unit (BLU) in an LCD panel.

FIG. 8B illustrates an example of a brightness enhance film in the backlight unit of FIG. 8A.

FIG. 15 illustrates performance of examples of LCD panels according to certain embodiments.

Figure 1:
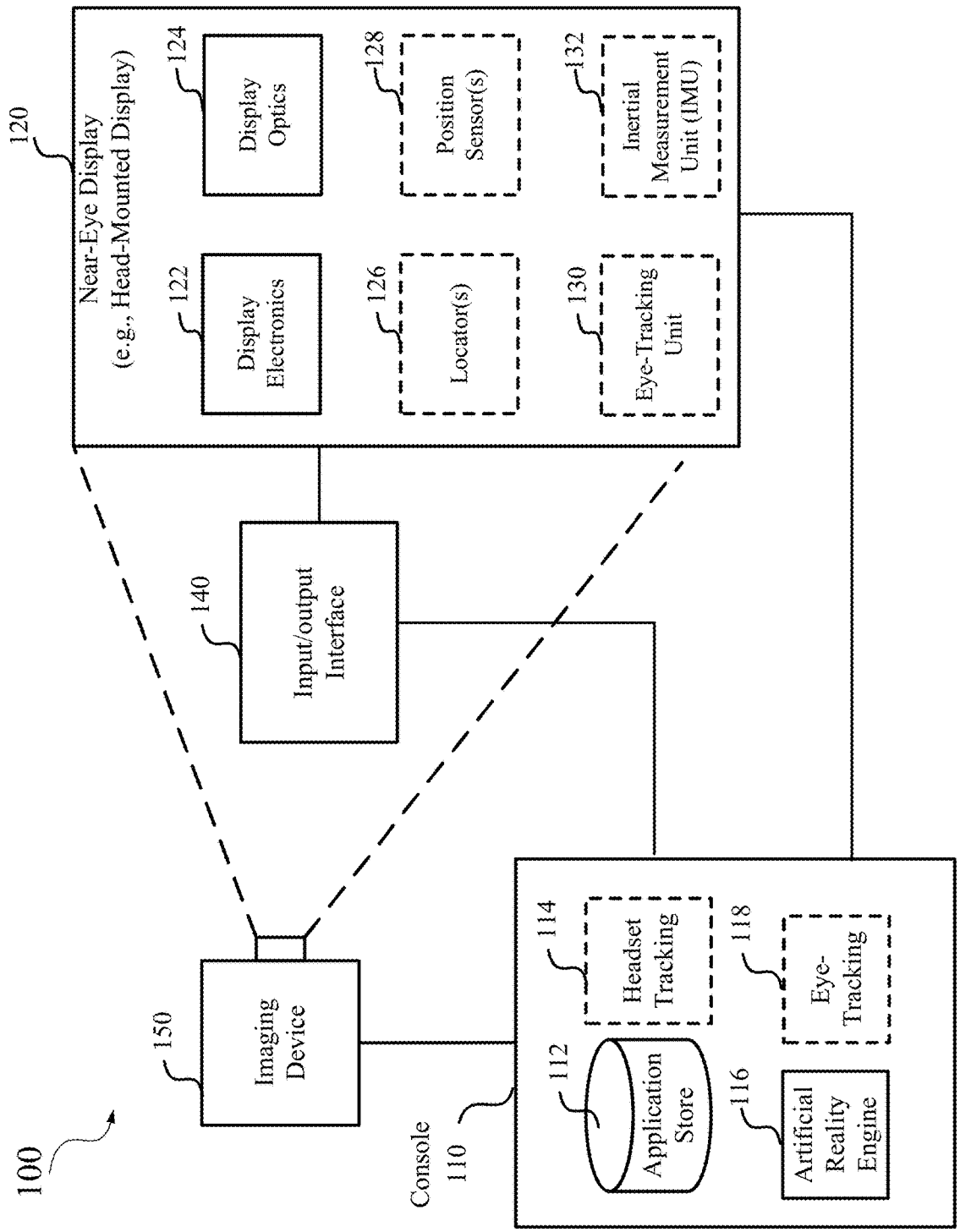
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to liquid crystal displays (LCDs). More specifically, and without limitation, techniques disclosed herein relate to improving the color gamuts and efficiencies of edge-lit backlight units (BLU)s for high-resolution LCD displays for near-eye display. Various inventive embodiments are described herein, including devices, systems, methods, structures, materials, processes, and the like.

In near-eye displays, the display panels or image sources may be implemented using, for example, a liquid crystal display (LCD), an organic light emitting diode (OLED) display, a micro-OLED display, an inorganic light emitting diode (ILED) display, a quantum-dot light emitting diode (QLED) display, a micro-light emitting diode (micro-LED) display, an active-matrix OLED display (AMOLED), a transparent OLED display (TOLED), or some other displays. It is generally desirable that the image source or the display panel of a near-eye display system has a higher resolution, a large color gamut, and a large size, such that the near-eye display system may have a large field of view (FOV) and better image quality to, for example, improve the immersive experience of using the near-eye display system. For a battery-powered near-eye display system, it may also be desirable that the system has a higher efficiency to improve the battery life of the system.

An LCD panel may include a backlight unit (BLU) and a liquid crystal (LC) panel that may modulate and filter light from the BLU at individual pixels. The LC panel may include a liquid crystal cell sandwiched by a bottom substrate and a top substrate. In some implementations, the bottom substrate may include thin-film transistor (TFT) circuits formed on a glass substrate for controlling the liquid crystal cell, whereas the top substrate may include a common electrode and an array of color filters formed on another glass substrate. In some implementations, the bottom substrate may include both TFT circuits and an array of color filters formed on a glass substrate (referred to as color filter on array (COA)), whereas the top substrate may include a common electrode and a black matrix formed on another glass substrate. In some implementations, pixel electrodes and the common electrode may both be formed on the bottom substrate, for example, in fringe field switching (FFS) mode liquid crystal display, whereas the top substrate may include a black matrix and an overcoat layer formed on another glass substrate.

LCD panels may offer some advantages over other display technologies, such as lower cost, longer lifetime, higher energy efficiencies, larger sizes, and the like. However, high-resolution LC panels (e.g., with a pixel per inch (PPI) greater than about 600 or higher such as 1400 or higher) may have low panel transmission. Therefore, it may be desirable to improve the efficiency of the BLU to improve the overall efficiency of the LCD panel. Many techniques can be utilized to improve the efficiency of BLU, such as prism-based brightness enhancement films (BEFs) that can manage the angular output of the light from BLU and focus light towards on-axis viewers of the display, reflective polarizer-based brightness enhancement films that can reflect polarized light not used by the LC panel to recycle the reflected light, and the like. However, further improvement of the efficiency may still be needed for LCD panels with high resolution.

In addition, conventional edge-lit BLUs based on white LEDs may provide a limited color gamut, such as standard red-green-blue (sRGB), which may represent only a limited portion of the range of colors that can be perceived by human eyes. Therefore, LCD panels with edge lit BLUs based on white LEDs may not provide images with sufficient color coverage to users. To improve the color saturation and the color gamut of the white LED-based BLUs, more aggressive color filters (e.g., filters with narrow passbands) may be needed, which may have higher attenuation in the passbands and thus may introduce substantial attenuation and reduce the efficiency of the BLUs.

In some embodiments, quantum dot films may be used in BLUs to convert blue light into green and red light. The emission spectrum of quantum dots in the quantum dot films may be precisely tuned and controlled by tailoring the sizes of the quantum dots. For example, the full width at half maximum (FWHM) of the emission spectrum of quantum dots of the same size may be less than about 30-40 nm or smaller. Therefore, the emitted red light and green light and the unconverted blue light may produce white light with narrow spectral peaks in the three primary colors. As such, LCD panels using quantum dots based BLUs may be able to achieve a large color gamut (e.g., equivalent to that of an OLED display or larger), even if color filters with wide passbands and low passband attenuation are used. The quantum dot film can also be made to be diffusive, such that no addition diffusers may be needed.

According to certain embodiments disclosed herein, to further improve the efficiency of an LCD panel including a quantum dot-based BLU, an optical efficiency enhancement film may be used to modify the angular beam profile of the light from the quantum dot film, such that the light beam from the BLU may be better collimated after passing through brightness enhancement prism films (e.g., including prism arrays), thereby further improving the on-axis display efficiency of the LCD panel. The optical efficiency enhancement film may be a hybrid film that includes prisms, pyramids, other micro-structures, or a combination thereof. The optical efficiency enhancement film may be a stand-alone film with a low thickness (e.g., less than about 100 μm, such as about 80 μm), or may be formed on the quantum dot film, and thus may have a minimum impact on the total thickness of the LCD panel. The LCD panels disclosed therein may be able to achieve on-axis efficiency gain (power saving) greater than, for example, about 12% with DCI-P3 color gamut, using highly efficient blue LEDs, diffusive quantum dot films, conventional color filters, optical efficiency enhanced films, and crossed prism films.

The LCD panels described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMO-LED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light-emitting diode (LED), a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 12 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 120 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking subsystem 114, an artificial reality engine 116, and an eye-tracking subsystem 118. Some embodiments of console 110 may include different or additional devices or subsystems than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the devices or subsystems of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking subsystem 114 may track movements of near-eye display 120 using slow calibration information from external imaging device 150. For example, headset tracking subsystem 114 may determine positions of a reference point of near-eye display 120 using observed locators from the slow calibration information and a model of near-eye display 120. Headset tracking subsystem 114 may also determine positions of a reference point of near-eye display 120 using position information from the fast calibration information. Additionally, in some embodiments, headset tracking subsystem 114 may use portions of the fast calibration information, the slow calibration information, or any combination thereof, to predict a future location of near-eye display 120. Headset tracking subsystem 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking subsystem 114. Artificial reality engine 116 may also receive estimated eye position and orientation information from eye-tracking subsystem 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking subsystem 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking subsystem 118 to more accurately determine the eye's orientation.

Figure 2:
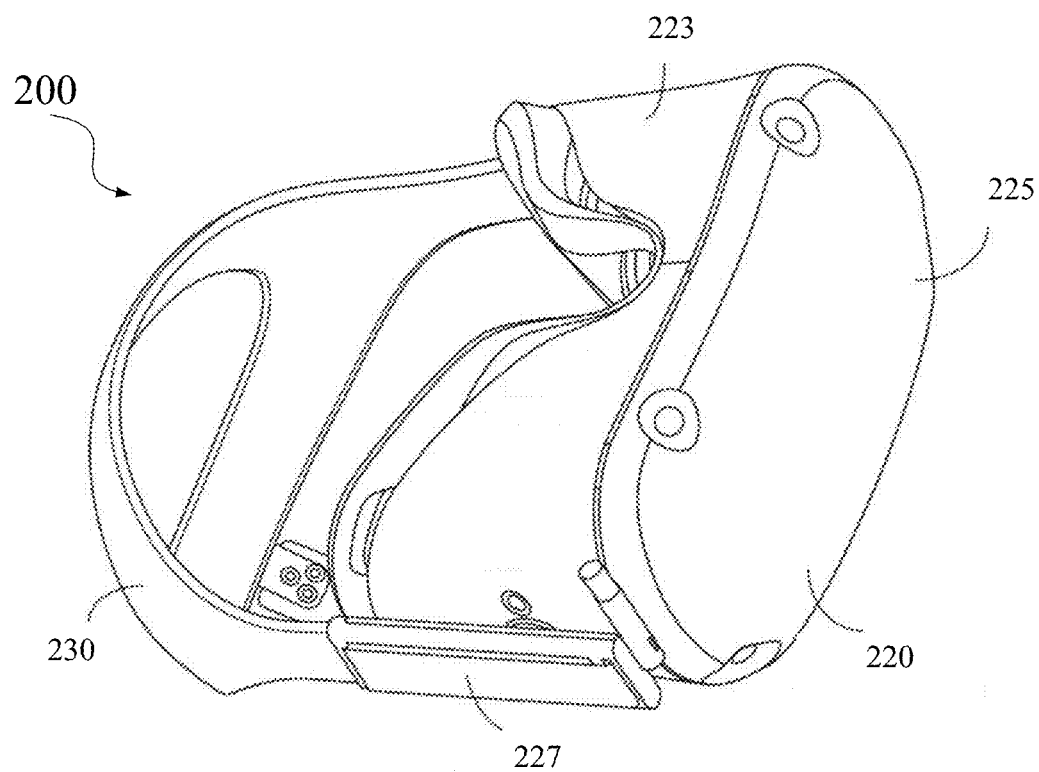
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
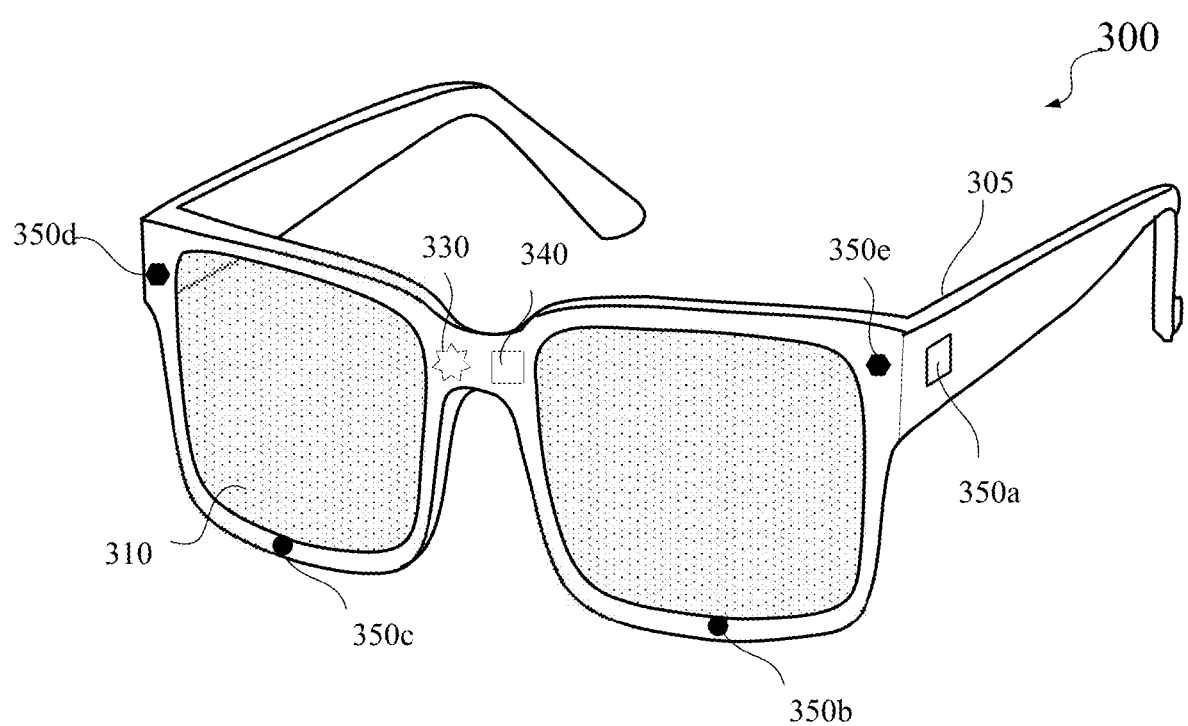
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. High-resolution camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
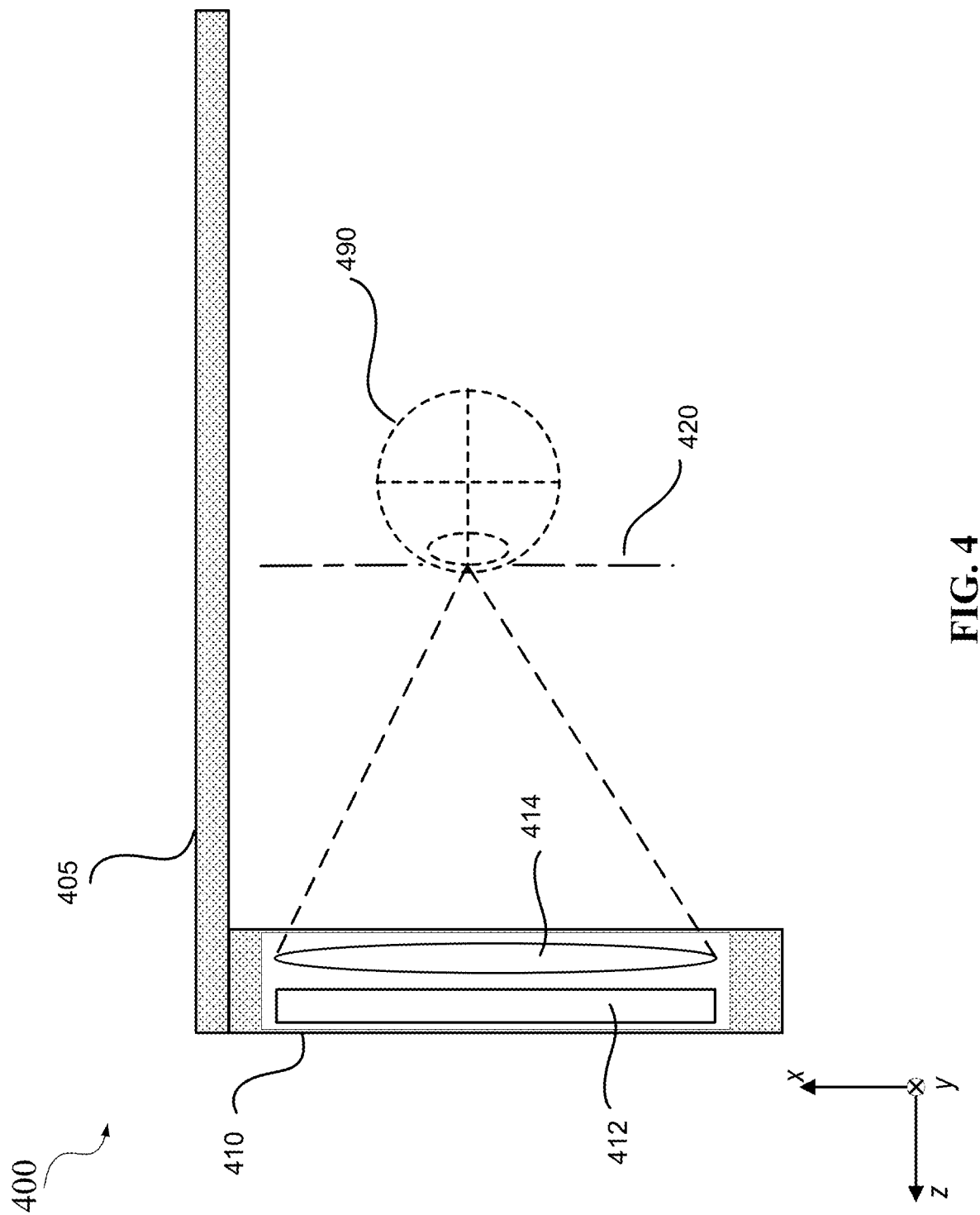
FIG. 4 is a cross-sectional view of an example of a near-eye display according to certain embodiments.

FIG. 4 is a cross-sectional view of an example of a near-eye display 400 according to certain embodiments. Near-eye display 400 may include at least one display assembly 410. Display assembly 410 may be configured to direct image light (e.g., display light) to an eyebox located at an exit pupil 420 and to user's eye 490. It is noted that, even though FIG. 4 and other figures in the present disclosure show an eye of a user of the near-eye display for illustration purposes, the eye of the user is not a part of the corresponding near-eye display.

As HMD device 200 and near-eye display 300, near-eye display 400 may include a frame 405 and display assembly 410 that may include a display 412 and/or display optics 414 coupled to or embedded in frame 405. As described above, display 412 may display images to the user electrically (e.g., using LCDs, LEDs, OLEDs) or optically (e.g., using a waveguide display and optical couplers) according to data received from a processing unit, such as console 110. In some embodiments, display 412 may include a display panel that includes pixels made of LCDs, LEDs, OLEDs, and the like. Display 412 may include sub-pixels to emit light of a predominant color, such as red, green, blue, white, or yellow. In some embodiments, display assembly 410 may include a stack of one or more waveguide displays including, but not restricted to, a stacked waveguide display, a varifocal waveguide display, and the like. The stacked waveguide display may be a polychromatic display (e.g., a red-green-blue (RGB) display) created by stacking waveguide displays whose respective monochromatic sources are of different colors.

Display optics 414 may be similar to display optics 124 and may display image content optically (e.g., using optical waveguides and optical couplers), correct optical errors associated with the image light, combine images of virtual objects and real objects, and present the corrected image light to exit pupil 420 of near-eye display 400, where the user's eye 490 may be located. In some embodiments, display optics 414 may also relay the images to create virtual images that appear to be away from display 412 and further than just a few centimeters away from the eyes of the user. For example, display optics 414 may collimate the image source to create a virtual image that may appear to be far away (e.g., greater than about 0.3 m, such as about 0.5 m, 1 m, or 3 m away) and convert spatial information of the displayed virtual objects into angular information. In some embodiments, display optics 414 may also magnify the source image to make the image appear larger than the actual size of the source image. More details of display 412 and display optics 414 are described below.

In various implementations, the optical system of a near-eye display, such as an HMD, may be pupil-forming or non-pupil-forming. Non-pupil-forming HMDs may not use intermediary optics to relay the displayed image, and thus the user's pupils may serve as the pupils of the HMD. Such non-pupil-forming displays may be variations of a magnifier (sometimes referred to as "simple eyepiece"), which may magnify a displayed image to form a virtual image at a greater distance from the eye. The non-pupil-forming display may use fewer optical elements. Pupil-forming HMDs may use optics similar to, for example, optics of a compound microscope or telescope, and may include some forms of projection optics that magnify an image and relay it to the exit pupil.

Figure 5:
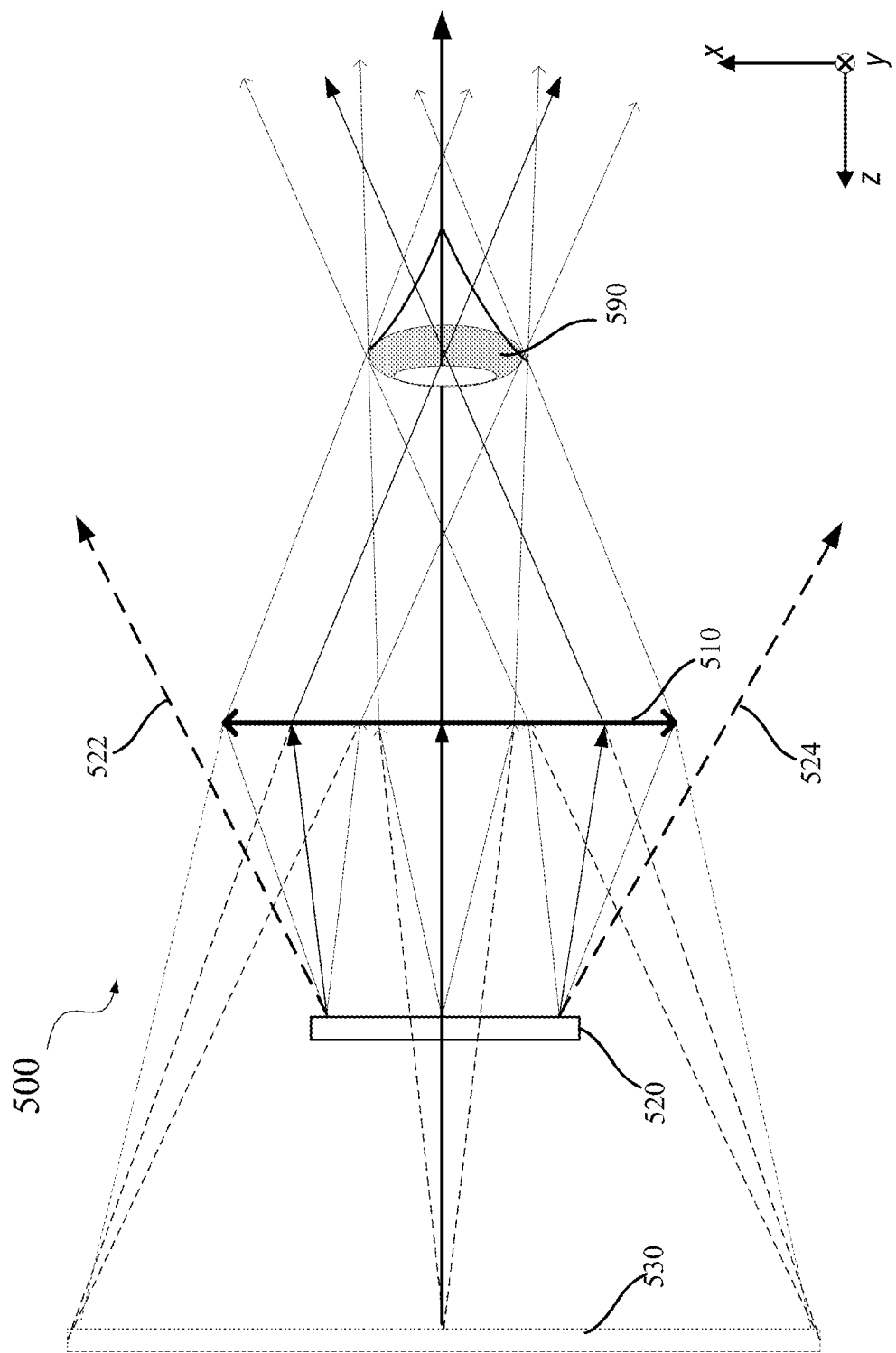
FIG. 5 illustrates an example of an optical system with a non-pupil forming configuration for a near-eye display device according to certain embodiments.

FIG. 5 illustrates an example of an optical system 500 with a non-pupil forming configuration for a near-eye display device according to certain embodiments. Optical system 500 may be an example of near-eye display 400, and may include display optics 510 and an image source 520 (e.g., a display panel). Display optics 510 may function as a magnifier. FIG. 5 shows that image source 520 is in front of display optics 510. In some other embodiments, image source 520 may be located outside of the field of view of the user's eye 590. For example, one or more deflectors or directional couplers may be used to deflect light from an image source to make the image source appear to be at the location of image source 520 shown in FIG. 5. Image source 520 may be an example of display 412 described above. For example, image source 520 may include a two-dimensional array of light emitters, such as semiconductor micro-LEDs or micro-OLEDs. The dimensions and pitches of the light emitters in image source 520 may be small. For example, each light emitter may have a diameter less than 2 μm (e.g., about 1.2 μm) and the pitch may be less than 2 μm (e.g., about 1.5 μm). As such, the number of light emitters in image source 520 can be equal to or greater than the number of pixels in a display image, such as 960×720, 1280×720, 1440×1080, 1920×1080, 2160×1080, 2560×1080, or even more pixels. Thus, a display image may be generated simultaneously by image source 520.

Light from an area (e.g., a pixel or a light emitter) of image source 520 may be directed to a user's eye 590 by display optics 510. Light directed by display optics 510 may form virtual images on an image plane 530. The location of image plane 530 may be determined based on the location of image source 520 and the focal length of display optics 510. A user's eye 590 may form a real image on the retina of user's eye 590 using light directed by display optics 510. In this way, objects at different spatial locations on image source 520 may appear to be objects on an image plane far away from user's eye 590 at different viewing angles. Image source 520 may have a size larger or smaller than the size (e.g., aperture) of display optics 510. Some light emitted from image source 520 with large emission angles (as shown by light rays 522 and 524) may not be collected and directed to user's eye 590 by display optics 510, and may become stray light.

The display panels or image sources described above (e.g., display 412 or image source 520) may be implemented using, for example, a liquid crystal display (LCD), an organic light emitting diode (OLED) display, a micro-OLED display, an inorganic light emitting diode (ILED) display, a micro-light emitting diode (micro-LED) display, an active-matrix OLED display (AMOLED), a transparent OLED display (TOLED), or some other displays. In a near-eye display system, it is generally desirable that the image source or the display panel has a higher resolution and a large size, such that the near-eye display system may have a large field of view (FOV) and better image quality to, for example, improve the immersive experience of using the near-eye display system. The FOV of a display system is the angular range over which an image may be projected in the near or far field. The FOV of a display system is generally measured in degrees, and the resolution over the FOV is generally measured in pixels per degree (PPD). The FOV of a display system may be linearly proportional to the size of the image source (e.g., the display panel), and may be inversely proportional to the focal length of the display optics (e.g., a collimation lens or lens assembly). A balance between the size of the image source and the optical power of the display optics may be needed in order to achieve a good modulation transfer function (MTF) and reduced size/weight/cost. The field of view may be increased by bringing the image source closer, but the image source would need to have higher PPD, and the aberrations of the display optics at the periphery may limit the effective field of view. To achieve a high PPD, micro displays with ultra-high pixels per inch (PPI) may be needed. There may be many technological challenges and cost issues associated with making high-PPI display panels, such as high resolution LCD panels.

Figure 6:
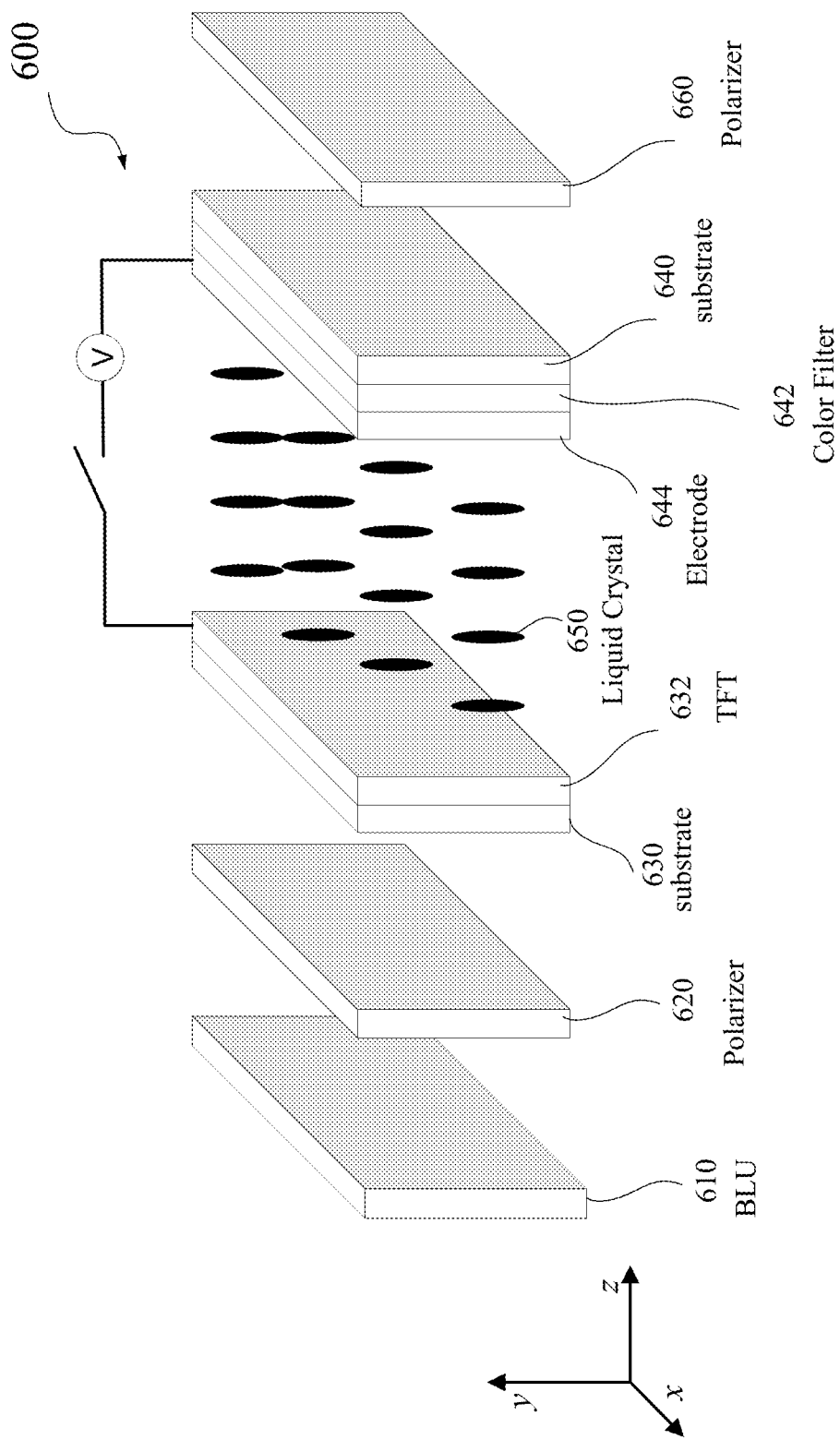
FIG. 6 illustrates an example of a liquid crystal display (LCD) panel.

FIG. 6 illustrates an example of an LCD panel 600. As illustrated, LCD panel 600 may include a backlight unit (BLU) 610 configured to emit illumination light, a first polarizer 620 configured to control the type of light that can pass through (e.g., based on the polarization state of the light), an LCD cell that may modulate (e.g., the phase or polarization state of) the incident light, and a second polarizer 660 for control the type of light that can pass through (e.g., based on the polarization state of the light). In some embodiments, BLU 610 may include a light source (e.g., a cold-cathode fluorescent lamp) configured to emit white light. In some embodiments, BLU 610 may include blue light-emitting LEDs, a light guide plate, and a quantum dot film that includes quantum dots for converting some blue light to red light and green light.

In the illustrated example, the LCD cell may include a first substrate 630 (e.g., a glass substrate or another transparent dielectric substrate) including a thin-film transistor (TFT) array 632 formed thereon. TFT array 632 may include an array of transistors for controlling the intensity of each pixel (e.g., by controlling the orientations of the liquid crystal molecules in a liquid crystal layer, thereby controlling the rotation angle of the polarization direction of the incident light). The LCD cell may also include a second substrate 640 with a common electrode 644 and a color filter (CF)/black-matrix (BM) array 642 formed thereon. One or more liquid crystal layers 650 may be sandwiched by first substrate 630 and second substrate 640.

In some other implementations, first substrate 630 may include both TFT array 632 and color filters formed on TFT array 632 to form a color filter on array (COA) structure, whereas the top substrate may include a common electrode and a black matrix formed on another glass substrate. The COA structure may enable a simplified process, improved aperture ratio, and reduced production cost. In some implementations, the LCD cell may be a fringe field switching (FFS) mode LCD cell, where the pixel electrodes and the common electrode may both be formed on the bottom substrate, and the top substate may include a black matrix and an overcoat layer formed thereon.

Light emitted by BLU 610 (e.g., white light or blue light) may be polarized by first polarizer 620 (e.g., a linear polarizer with a polarizing axis in a first direction). The polarized light may pass through an array of apertures between the TFTs in TFT array 632. The polarized light may be modulated by the one or more liquid crystal layers 650 to change the polarization state (e.g., the polarization direction) according to the voltage signal applied to each region of the one or more liquid crystal layers 650. CF/BM array 642 may include red, green, and blue color filters, where each color filter may allow light of one color to pass through. Light passing through each color filter may become a subpixel of a color image pixel that may include three subpixels, and may be filtered by second polarizer 660 such that the change in the polarization state may be converted into a change in the light intensity or brightness. For example, second polarizer 660 may include a linear polarizer with a polarizing axis in a second direction that may be the same as or different from the first direction.

Figure 7:
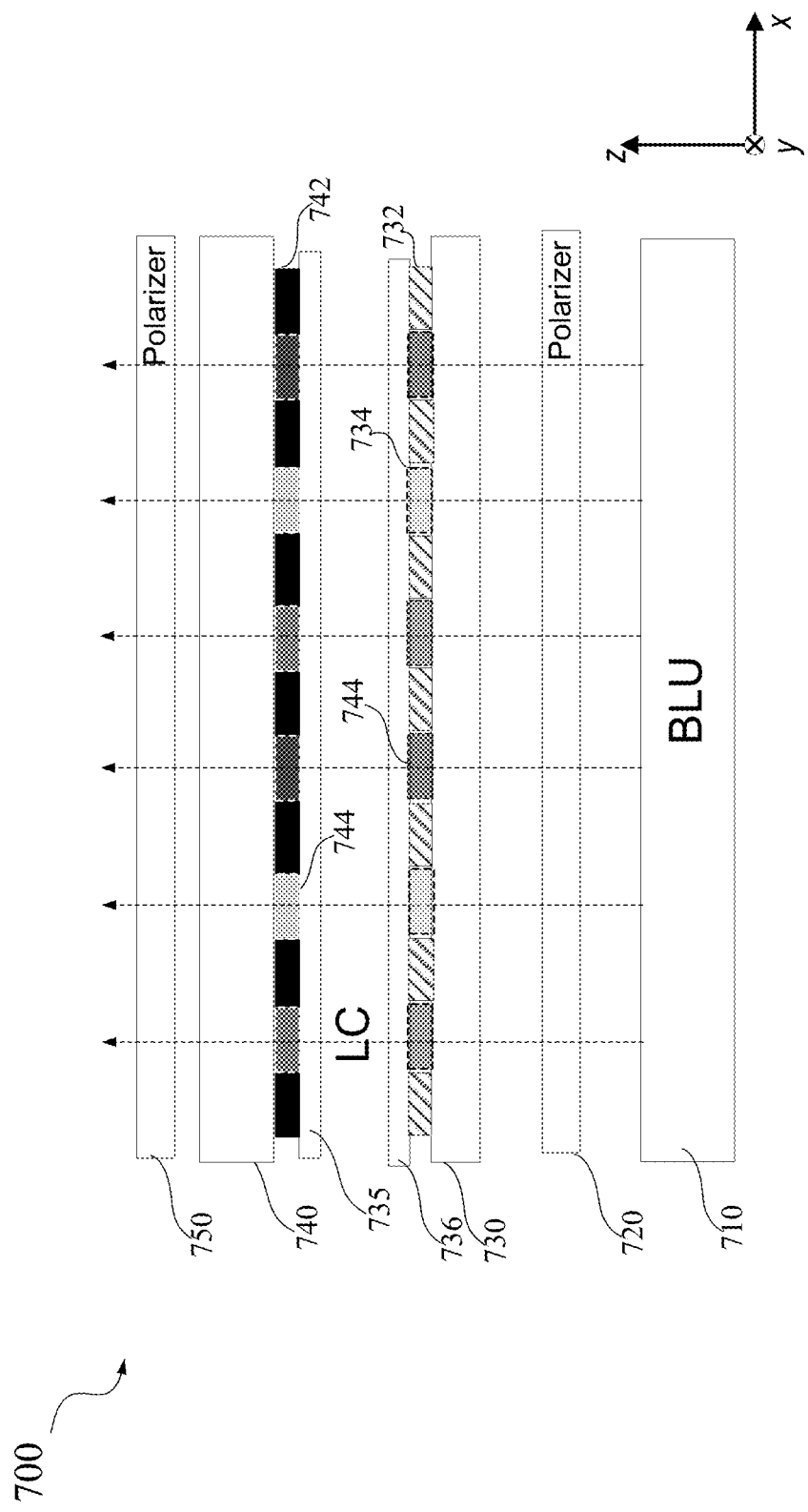
FIG. 7 illustrates an example of a layer stack of an LCD panel.

FIG. 7 illustrates an example of a layer stack of an LCD panel 700. LCD panel 700 may be an example of LCD panel 600. In the illustrated example, LCD panel 700 may include a BLU 710, a first polarizer 720, a first substrate 730 including a TFT array and/or black-mask 732 and an array of apertures 734 formed thereon, a common electrode layer 735, a second substrate 740 with a CF/BM array including a black-matrix layer 742 and optionally an array of color filters 744 in black-matrix layer 742, and a second polarizer 750. BLU 710 may be similar to BLU 610 described above. TFT array and/or black-mask 732 may include TFT circuits (e.g., TFTs, gate electrodes, source electrodes, etc.) for controlling liquid crystal molecules filled between first substrate 730 and second substrate 740. Common electrode layer 735 may include a transparent conductive oxide (TCO), such as indium tin oxide (ITO). Color filters 744 may include red, green, and blue color filters. Centers of color filters 744 may align with corresponding centers of apertures 734 on first substrate 730, such that light from BLU 710 and first polarizer 720 may pass through apertures 734 and color filters 744. Second polarizer 750 may include a linear polarizer with a polarizing axis in a direction that is different from or same as the direction of the polarizing axis of first polarizer 720. For example, the direction of the polarizing axis of first polarizer 720 may be orthogonal to the direction of the polarizing axis of second polarizer 750. First polarizer 720 and second polarizer 750 may be used in combination to convert the change in the polarization state (e.g., polarization direction) by the liquid crystal layer to change in the light intensity so as to display images to user's eyes.

As described above with respect to FIG. 6, in some implementations, instead of forming color filters 744 on a separate substrate, color filters 744 may be formed on first substrate 730 (e.g., between TFT array and/or black-mask 732) to form a COA structure. In some implementations, the LCD cell may be an FFS mode LCD cell, where both the pixel electrodes and the common electrode may be formed on first substrate 730 that includes the TFT array and/or black-mask 732. In other implementations, the TFT array, the color filters, the black matrix, and the electrodes may be arranged in other manners on the two substates that sandwich the liquid crystal material.

Even though not shown in FIG. 7, spacers (e.g., plastic spacers) may be used between TFT array and/or black-mask 732 and common electrode layer 735 to separate TFT array and/or black-mask 732 and common electrode layer 735 so that liquid crystal materials may be filled between TFT array and/or black-mask 732 (or a protective or planarization layer 736) and common electrode layer 735 to modulate incident light. For example, TFT array and/or black-mask 732 may include column spacers formed thereon (e.g., on top of source electrodes), and the CF/BM array (or black-matrix layer 742 or common electrode layer 735) may include photo spacers formed thereon. When first substrate 730 and second substrate 740 are assembled to form an LCD cell, photo spacers may sit on corresponding column spacers to achieve the desired separation between TFT array and/or black-mask 732 and the CF/BM array (or black-matrix layer 742 or common electrode layer 735).

LC panels with higher PPIs (e.g., >600, such as about 1400) may have lower panel transmission. Therefore, it may be desirable to improve the output intensity and efficiency of the BLU to improve the brightness and the overall efficiency of the LCD panel. Many techniques can be utilized to improve the efficiency of BLU, such as prism-based brightness enhance films (BEFs) that can manage the angular output of the light from BLU and focus light towards on-axis viewers of the display, reflective polarizer-based dual brightness enhancement films (DBEFs) that can reflect polarized light not used by the LC panel so that the reflected light can be recycled, and the like.

FIG. 8A illustrates an example of a backlight unit (BLU) 802 in an LCD panel 800. LCD panel 800 may include an LC panel 804 and BLU 802, which may be an example of BLU 610 or 710. In the illustrated example, BLU 802 may include a light source 810, a light guide plate (LGP) 820, an optional enhanced specular reflector (ESR) film 830, a diffuser 840, a bottom BEF 850, a top BEF 860, and a reflective polarizer 870. Light source 810 may include a light source configured to emit white light, such as an array of LEDs. The array of LEDs may include blue-light emitting LEDs and phosphors (e.g., yttrium, aluminum and garnet (YAG) phosphors) that may convert some blue light to green, yellow, and red light to produce white light.

Light emitted by light source 810 may be coupled into LGP 820 and may be guided by LGP 820 (e.g., through total internal reflection) to propagate in approximately the x direction. Portions of the light guided by LGP 820 may be coupled out of LGP 820 towards diffuser 840 by microstructures, such as, for example, V-shaped blades, printed dots, particulates, diffusion reflectors, and the like, formed on LGP 820. LGP 820 may be flat or may have a wedge shape. ESR film 830 may include a multi-layer optical film (e.g., including dielectric materials) that forms a highly efficient specular reflector, such as with a reflectivity greater than about 95% or higher. ESR film 830 may be used to reflect incident light back towards LGP 820 and LC panel 804.

Light emitted from LGP 820 may be diffused by diffuser 840 to generate a uniform light pattern that has low light intensity variation. Bottom BEF 850 and top BEF 860 may include prismatic structures to focus light towards on-axis viewers of the display. Bottom BEF 850 and top BEF 860 may be used alone to provides up to about 60% increase in on-axis brightness, or may be used in combination (e.g., oriented at about 90° with respect to each other) to provide up to about 120% increase in on-axis brightness. Bottom BEF 850 and top BEF 860 may use refraction and reflection to increase the efficiency of backlighting. For example, bottom BEF 850 and top BEF 860 may refract light within a certain emission cone (e.g., within about 35° with respect to the z direction) toward the viewer, whereas light outside the emission cone may be reflected and at least partially recycled until it exits the film at angles within the emission cone.

FIG. 8B illustrates an example of top BEF 860 in backlight unit 802 of FIG. 8A. As illustrated, top BEF 860 may include a substrate 862 and an array of prisms 864 formed on substrate 862. Substrate 862 may include, for example, polyester or another organic or inorganic material. The array of prisms 864 may include, for example, an acrylic resin. The array of prisms 864 may have prism angles, for example, about 90°, and may have a pitch, for example, about 50 µm. As shown in FIG. 8B, light incident on surfaces of the prisms of top BEF 860 from certain angles may be refracted out of top BEF 860, which may result in a confined emitted cone (e.g., within ±35° with respect to the normal direction) with increased (e.g., by about 58%) luminous intensity. Some light incident on surfaces of the prisms of BEF 860 at angles greater than the critical angle may be reflected at the surfaces due to total internal reflection, and may be further reflected by other surfaces of the prisms back to LGP 820 and ESR film 830. The light reflected back by top BEF 860 may be recycled, for example, by ESR film 830, which may reflect the incident light back towards top BEF 860. A small portion of the light incident on top BEF 860 may be reflected and then refracted out of top BEF 860 and become stray light.

Reflective polarizer 870 may transmit light of a first polarization state to LC panel 804 for modulation and filtering. Reflective polarizer 870 may reflect (rather than absorbing) light of an orthogonal second polarizations state. The light of the second polarization state reflected by reflective polarizer 870 may be reflected back to reflective polarizer 870 by, for example, ESR film 830, where the reflected light may be at least partially converted to light of the first polarization state and thus may at least partially be transmitted by reflective polarizer 870 to LC panel 804. Therefore, light of the second polarization state may be recycled and eventually transmitted by reflective polarizer 870 towards LC panel 804, thereby improving the efficiency of BLU 802.

As described above, in many existing LCD BLUs, the light sources are white LEDs. The most common white LEDs include LEDs that emit blue light. To produce a full visible spectrum, the blue LEDs may be coated with a yellow phosphor (e.g., yttrium aluminum garnet (YAG) phosphor). The resultant light may be a bright, daylight white consisting of a peak from the blue LEDs and a broad yellow hump from the yellow phosphor in the spectrum. When the white light has significant portions of wavelengths other than the primary red, green, and blue wavelengths (e.g., yellow or pink light), these non-primary, intermediate colors may leak through a color filter. For example, a red color filter may transmit light with wavelengths greater than 570 nm (including a mixing of yellow, orange, and red light). The mixing of wavelengths may prevent the LCD from producing, for example, pure red light. Therefore, edge-lit BLU based on white LEDs may only provide a limited color gamut, such as the standard red-green-blue (sRGB) color gamut, which may be only about 70% of the size of the color gamut that OLEDs may produce. Many of the colors in the color gamut that can be perceived by human eyes may not be produced by LCD displays. The limited gamut of the LCD displays may constrain vivid color presentation to users, and may result in limit user experience and attention.

In some embodiments, quantum dot films may be used in BLUs to convert blue light into green and red light. The quantum dots may include semiconductor nanoparticles with diameters between, for example, about 1 nm and about 10 nm. In some embodiments, the quantum dots may have a core-shell structure. A quantum dot may absorb light with relatively short wavelengths (e.g., blue light) and emit a narrow spectrum of light at slightly longer wavelengths. The wavelengths of the emitted light may be determined by the size of the quantum dot. In general, smaller quantum dots may emit light with shorter wavelengths, while larger quantum dots may produce light with longer wavelengths. For example, when blue photons (with a wavelength around 450 nanometers) strike a 3-nanometer quantum dot, saturated green light may be generated. When the blue photons strike a 7-nanometer quantum dot, saturated red light may be generated. Therefore, the emission spectrum of quantum dots can be precisely tuned and controlled by tailoring the sizes of the quantum dots. For example, the full width at half maximum (FWHM) of the emission spectrum of quantum dots of the same size may be less than about 30-40 nm or smaller. When green light-emitting quantum dots and red light-emitting quantum dots are mixed and illuminated by blue light from blue LEDs, the emitted red light and green light and the unconverted blue light may produce white light with narrow spectral peaks in the three primary colors. Thus, LCD panels using quantum dots based BLUs may be able to achieve a large color gamut (e.g., equivalent to that of an OLED display or larger), even if color filters with wide passbands and low passband attenuation are used.

Figures 9A, 9B:
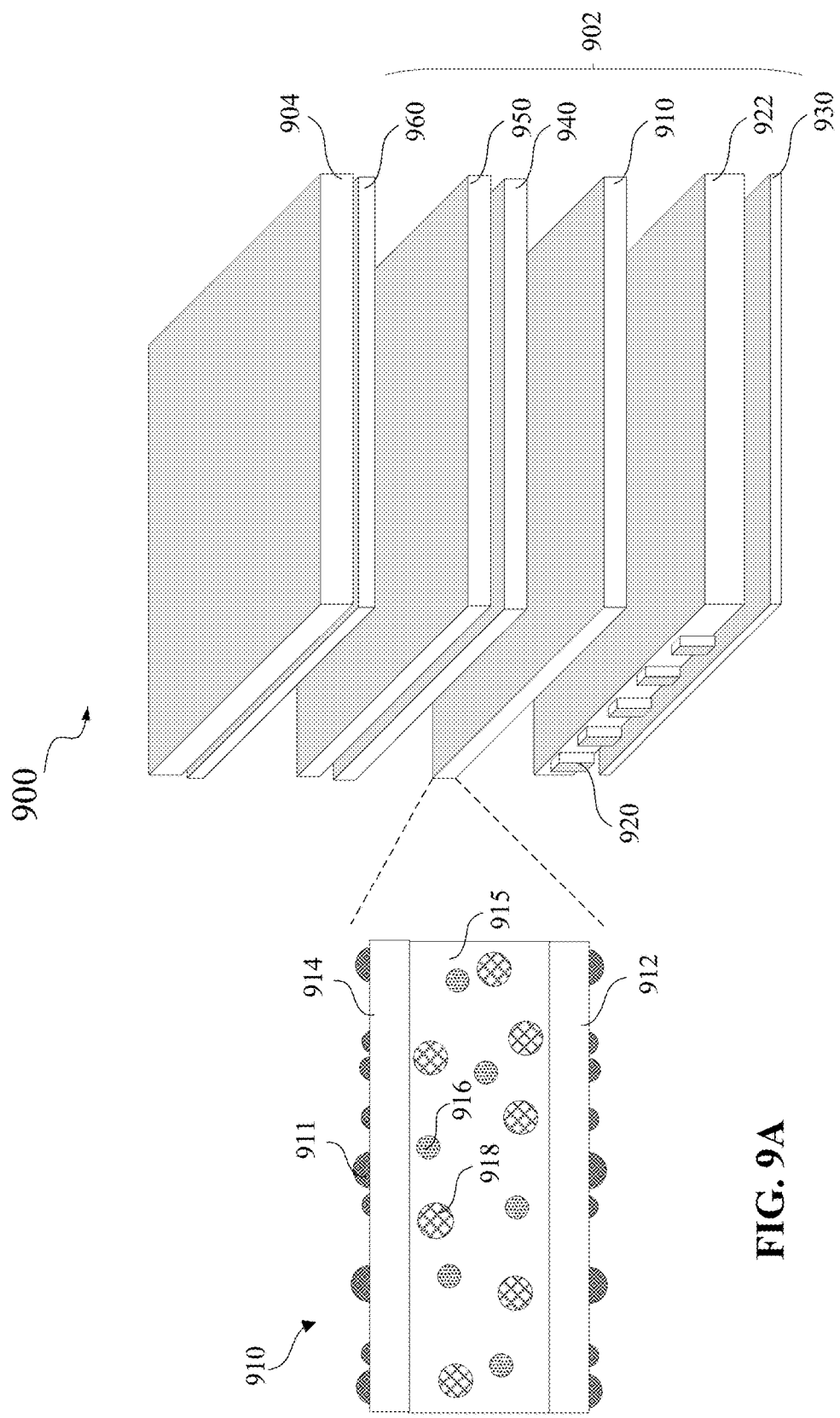
FIG. 9A illustrates an example of a quantum dot film (QDF).
FIG. 9B illustrates an example of a backlight unit including the QDF of FIG. 9A.

FIG. 9A illustrates an example of a quantum dot film (QDF) 910. In the illustrated example, QDF 910 may include an upper barrier film 914, a middle quantum dot matrix material layer 915, and a lower barrier film 912. QDF 910 may have a total thickness about tens of microns, such as less than about 100 µm, less than about 80 µm, less than about 60 µm, or less than about 50 µm. Quantum dot matrix material layer 915 may include quantum dots 916 and 918 dispersed in a polymer material. Quantum dots 916 and 918 may have different sizes, and thus may emit light of different colors. For example, the size of quantum dots 916 may be smaller (e.g., with diameters about 2.5 nm or about 3 nm) and may be selected such that quantum dots 916 may absorb blue light and emit light with a narrow peak in the green light band. The size of quantum dots 918 may be larger (e.g., with diameters about 6 or 7 nm) and may be selected such that quantum dots 918 may absorb blue light and emit light with a narrow peak in the red light band. The number of quantum dots and the ratio of the number of quantum dots 916 to the number of quantum dots 918 may be determined based on, for example, the color specification of the display, the degree of light recycling in the BLU, the properties of the color filters, and the overall thickness of the film. The red light and green light emitted by quantum dots 916 and 918, and the unconverted blue light may produce white light with narrow spectral peaks in the three primary color bands. The quantum dots need to be distributed uniformly in quantum dot matrix material layer 915 to create even color across the entire display.

The quantum dots may be protected from oxygen and moisture by barrier films 912 and 914. The protective barrier films 912 and 914 may have high flexibility, high transparency, and low permeability, and may be laminated on quantum dot matrix material layer 915 to form a barrier to water vapor and oxygen. Barrier films 912 and 914 may be several orders of magnitude more impermeable than conventional packaging grade barrier films. As a result, barrier films 912 and 914 may provide extraordinary protection to quantum dot matrix material layer 915 while being optically clear and flexible. Barrier films 912 and 914 may also be thinner, lighter, more flexible, and more impact-resistant than glass. In some embodiments, diffusive micro-structures 911 (e.g., micro- or nano-particulates) may be formed on barrier films 912 and 914, such that QDF 910 may have diffusive properties and can be used as a diffuser in an LCD panel.

FIG. 9B illustrates an example of an LCD panel 900 including QDF 910 of FIG. 9A in a BLU 902. LCD panel 900 may include BLU 902 and an LC panel 904. As described above, LC panel 904 may include LC cells, electrical circuits (e.g., TFT circuits and electrodes), color filters, and a black mask. In the illustrated example, BLU 902 may include an array of blue LEDs 920, a light guide plate 922, an ESR film 930, QDF 910, bottom BEF 940, top BEF 950, and a reflective polarizer 960. ESR film 930 may be similar to ESR film 830 described above and may be used to specularly reflect incident light towards LC panel 904. Light guide plate 922 may be similar to LGP 820 of FIG. 8A and may be used to guide and direct the light emitted by the array of blue LEDs 920 towards LC panel 904. Bottom BEF 940 and top BEF 950 may include prisms formed thereon and may be oriented such that the prims on top BEF 950 may extend in a direction perpendicular to the extension direction of the prisms on bottom BEF 940. As described above with respect to FIG. 8B, bottom BEF 940 and top BEF 950 may allow light within a certain emission cone (e.g., within about ±35° with respect to the z direction) to pass through bottom BEF 940 and top BEF 950, and may reflect most other incident light back towards QDF 910, where the reflected light may be at least partially recycled (reflected back to bottom BEF 940 and top BEF 950 by, for example, ESR film 930) to improve the overall efficiency of BLU 902. Reflective polarizer 960 may be similar to reflective polarizer 870, and may be used to transmit light of a first polarization state to LC panel 904 and reflect (rather than absorbing) light of an orthogonal polarization state for recycling (e.g., polarization state conversion and reflection back to reflective polarizer 960), to further improve the overall efficiency of BLU 902.

QDF 910 may include quantum dot matrix material layer 915 sandwiched by barrier film 914 and barrier film 912 as described above with respect to FIG. 9A, and may convert some blue light into red light and green light, thereby generating white light including a combination of red, green, and blue light. QDF 910 may also include additional diffusive structures that may diffuse the light to form a uniform white light source. Therefore, BLU 902 may not need an additional diffuser such as diffuser 840.

In addition, as described above, by selecting and controlling the sizes of the quantum dots, red light and green light with narrow spectral bandwidths may be generated, such that the white light emitted by QDF 910 may include fewer non-primary, intermediate colors, such as yellow, orange, and pink colors. The spectral bands of the red, green, and blue light may fall within the peak passbands of the color filters that can have wider passbands and lower attenuation in the passbands. Therefore, the emitted light, after passing through the color filters, may primarily include red, green, and blue light with narrow spectral bandwidths, and may have lower leakage of the non-primary, intermediate colors. Therefore, LCD panel 900 may produce more saturated colors and may have a wider color gamut. Since color filters with wider passbands and lower attenuation in the passbands can be used in LC panel 904, the color filters may have lower loss for the primary colors.

Figure 10A:
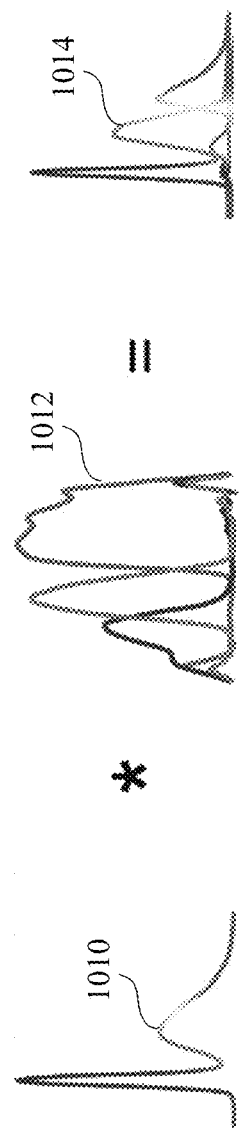
FIG. 10A illustrates an example of the output spectrum achieved by filtering output of Yttrium Aluminum Garnet (YAG) white LED-based BLU using color filters.

FIG. 10A illustrates an example of the output spectrum achieved by filtering output of Yttrium Aluminum Garnet (YAG) white LED-based BLU using color filters. In FIG. 10A, a curve 1010 shows the output spectrum of an example of a YAG white LED. The YAG white LED may include a blue light-emitting LED and YAG phosphors, where the YAG phosphors may convert blue light into light with a broad yellow hump in the spectrum. Therefore, light emitted by the YAG white LED may have a narrow peak in the blue range, but the remaining energy may be spread across the rest of the visible spectrum. Curves 1012 shows the passbands of blue, green, and red color filters that may be used to filter the white light emitted by the YAG white LED. As illustrated, the passbands of the color filters may have some overlap and may allow non-primary, intermediate colors to pass through. For example, the red color filter may have a broad passband and may allow light with wavelengths longer than about 570 nm to pass through. Therefore, yellow, orange, pink, and red lights in the broad yellow hump shown in curve 1010 may be able to pass through the red color filters, as shown by curves 1014 of the spectrum of the output light from the color filters. This mixture of color wavelengths may prevent the LCD from producing, for example, a pure red color for a red subpixel of the LCD display. Curves 1014 shows that the red light and green light in the output light from the color filters may not be pure and bright (e.g., having a low color saturation). To improve the color saturation and the color gamut of the white LED-based BLU, special and less efficient LEDs and/or more aggressive color filters (e.g., filters with narrow passbands) may be needed, which may introduce substantial attenuation and reduce the efficiency of the BLU.

Figure 10B:
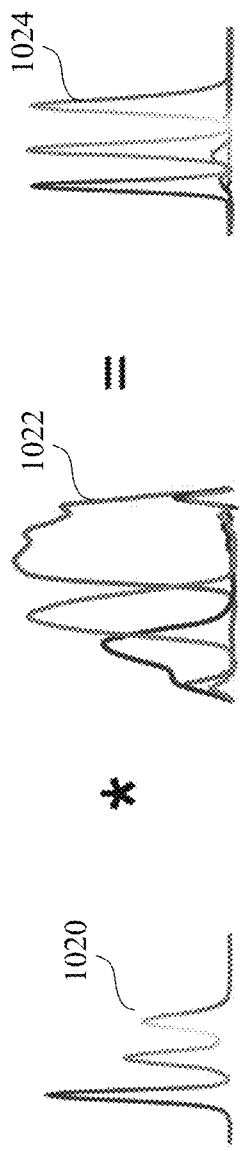
FIG. 10B illustrates an example of the output spectrum achieved by filtering output of QDF-based BLU using color filters.

FIG. 10B illustrates an example of the output spectrum achieved by filtering output of QDF-based BLU using color filters. A curve 1020 shows the output spectrum of an example of a QDF, such as QDF 910. As described above, the QDF may include quantum dots of two different sizes, which may convert blue light into green light and red light, respectively. The sizes of the quantum dots may be controlled such that the light emitted by the quantum dots may be in narrow spectral bands, with fewer non-primary, intermediate colors, as shown by the narrow peaks of green light and red light in curve 1020. Curves 1022 shows the passbands of blue, green, and red color filters that may be used to filter the white light emitted by the QDF. Even though the passbands of the color filters may be wide, the light passing through the color filters may primarily include saturated blue, green, and red light, with fewer intermediate colors, as shown by curves 1024 of the spectrum of the output light from the color filters, because the input light may have fewer intermediate colors (or have intermediate colors with very low intensities) that may pass through the color filters with wide passbands. Therefore, an LCD panel with a QDF-based BLU can produce a wide color gamut with a high efficiency, using highly efficient blue LEDs, quantum dots, and conventional color filters.

Figure 10C:
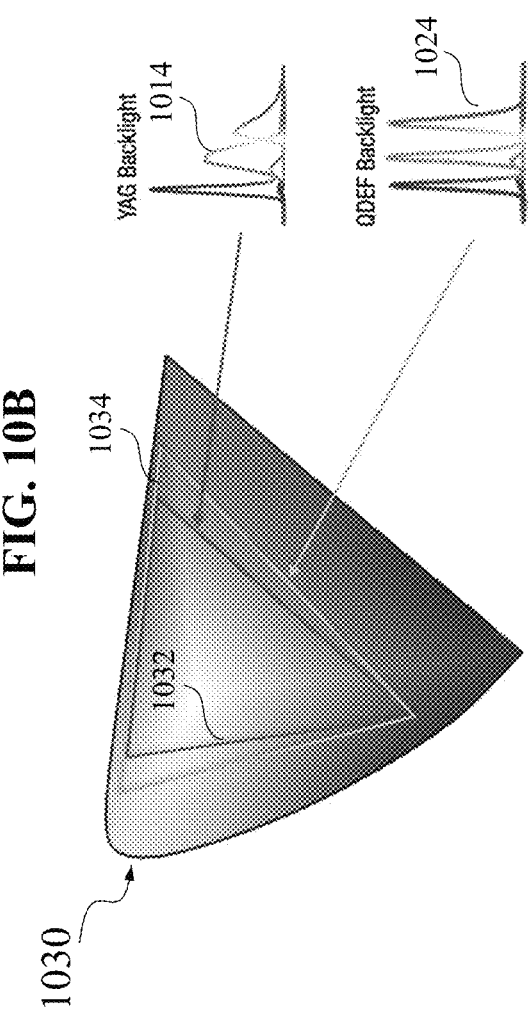
FIG. 10C shows color gamuts produced by an example of a YAG white LED-based BLU and an example of a QDF-based BLU.

FIG. 10C shows color gamuts produced by an example of a YAG white LED-based BLU and an example of a QDF-based BLU. In FIG. 10C, a triangle 1032 in the International Commission on Illumination (CIE) 1976 color space chromaticity diagram 1030 indicates the color gamut that may be displayed by an LCD panel with a YAG white LED-based BLU, whereas a triangle 1034 indicates the color gamut that may be displayed by an LCD panel with a QDF-based BLU. FIG. 10C shows that the color gamut produced by the LCD display with the QDF-based BLU may be approximately 50% larger than the color gamut produced by a similar LC panel and a YAG white LED-based BLU.

Figure 11:
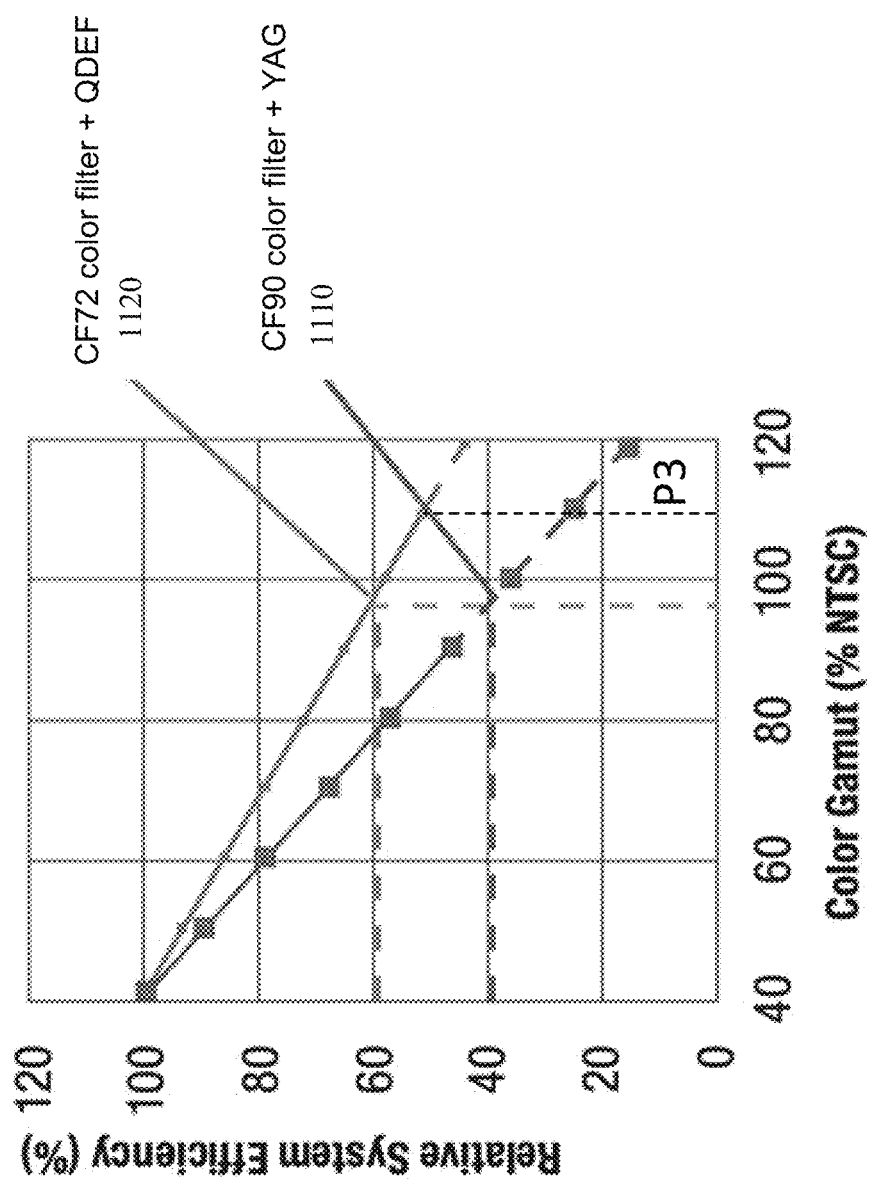
FIG. 11 shows relative system efficiencies and display color gamuts produced by examples of YAG white LED-based BLUs and QDF-based BLUs.

FIG. 11 shows relative system efficiencies and display color gamuts produced by examples of YAG white LED-based BLUs and QDF-based BLUs. In FIG. 11, a line 1110 shows the relationship between the relative system efficiency and the size of the display color gamut (with respect to the size of the NTSC color gamut) of an LCD display using a YAG white LED-based BLU and CF90+ color filters (which may have narrower passbands). A line 1120 shows the relationship between the relative system efficiency and the size of the display color gamut (with respect to the size of the NTSC color gamut) of an LCD display using a QDF-based BLU and CF72 color filters (which may have wider passbands and lower passband loss than CF90+ color filters).

As shown by FIG. 11, QDF-based BLUs may be up to about 15% more efficient than YAG white LED-based BLUs in achieving the sRGB color gamut, because a display with a QDF-based BLU can express the sRGB gamut using more transmissive color filters (e.g., CF65) such that less light is needed from the QDF-based BLU to achieve the desired display brightness. For larger color gamuts (e.g., Adobe RGB or DCI P3), the energy saving of QDF-based BLUs is even more significant. As described above, an alternative technique to achieve larger gamuts is through the use of color filters with narrower passbands, which may have lower passband transmissivity. Since these color filters may block more light, much brighter backlight illumination may be needed to achieve the desired display brightness. Compared to displays using these more saturated, narrow-band color filters, QDF-based displays with more transmissive color filters (e.g., CF72 color filters) can be up to 50% more energy efficient in expressing larger color gamuts such as Adobe RGB or DCI P3 color gamut.

According to certain embodiments, to further increase the efficiency (e.g., on-axis efficiency) of QDF-based LCD display, an optical efficiency enhancement film may be used to modify the angular beam profile of the light from the QDF, such that the light beam from the BLU may be better collimated after passing through brightness enhancement prism films (e.g., including prism arrays), thereby further improving the on-axis display efficiency of the LCD panel. The optical efficiency enhancement film may be a hybrid film that includes prisms, pyramids, other micro-structures, or a combination thereof. In some embodiments, the optical efficiency enhancement film may be a stand-alone film with a low thickness (e.g., less than about 100 µm). In some embodiments, the optical efficiency enhancement film may be formed on a QDF film, and may have a minimum impact on the total thickness of the LCD panel.

Figure 12:
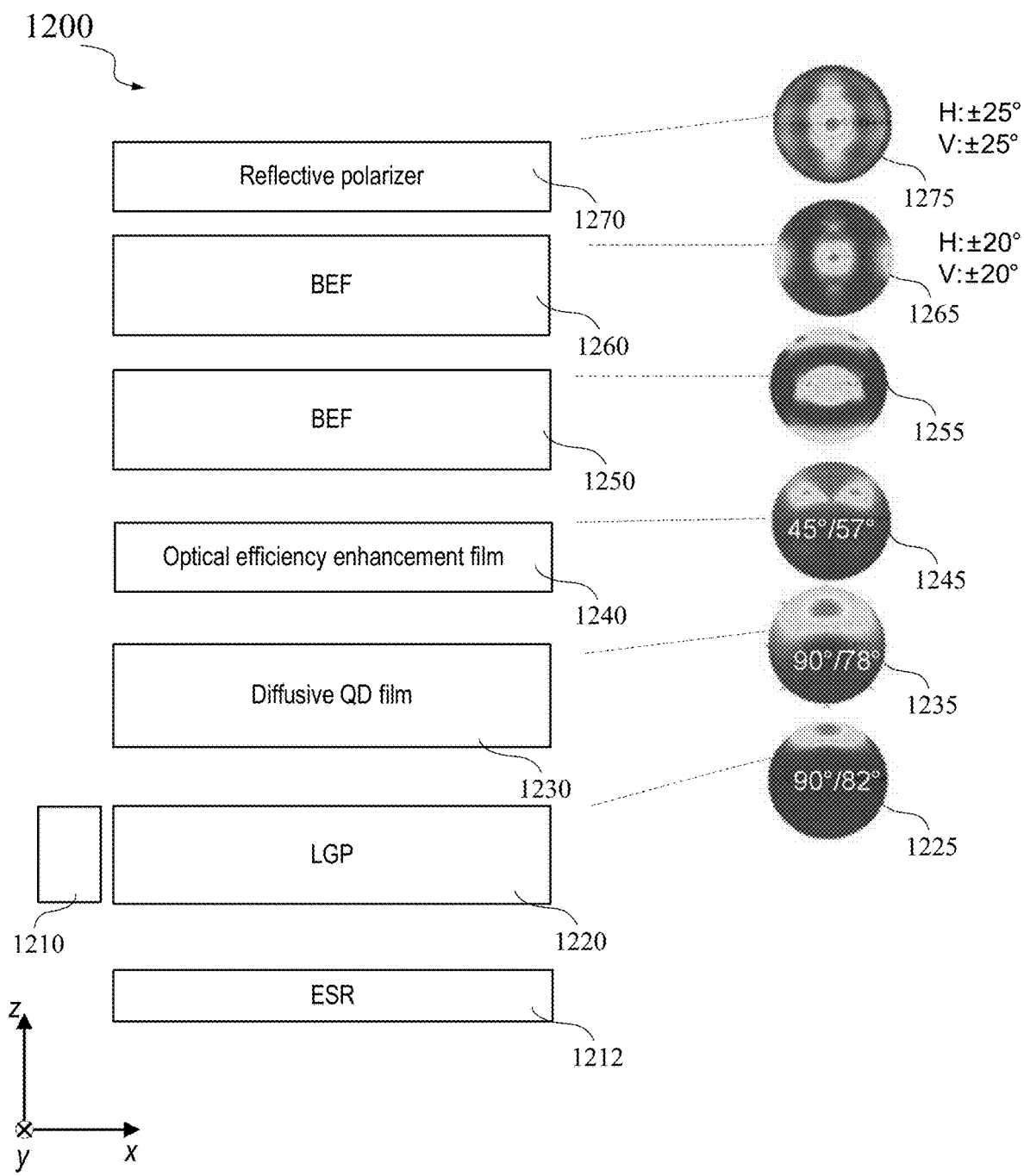
FIG. 12 illustrates an example of a QDF-based BLU including an optical efficiency enhancement film in an LCD panel according to certain embodiments.

FIG. 12 illustrates an example of a QDF-based BLU 1200 including an optical efficiency enhancement film 1240 in an LCD panel according to certain embodiments. In the illustrated example, QDF-based BLU 1200 may include a light source 1210 that may include an array of blue LEDs. Blue light emitted by light source 1210 may be coupled into LGP 1220 and may be guided by LGP 1220 to propagate in approximately the x direction. LGP 1220 may couple portions of the blue light propagating within LGP 1220 out of LGP 1220 as described above with respect to, for example, LGP 820 of FIG. 8A, such that the light emitting area may be expanded to approximately the size of LGP 1220. A diagram 1225 shows an example of the angular beam profile of the light emitted from LGP 1220. In the example illustrated in diagram 1225, the peak intensity of the light beam emitted from LGP 1220 may be in a direction with an azimuthal angle about 90° and a polar angle about 82°. An ESR film 1212 may be below LGP 1220 and may reflect incident light from the side of LGP 1220 back towards LGP 1220 to recycle the light.

Blue light from LGP 1220 may be incident on a diffusive quantum dot film 1230, which may be an example of QDF 910 described above. Diffusive quantum dot film 1230 may include quantum dots configured to absorb blue light and emit red and green light. Diffusive quantum dot film 1230 may also diffuse the emitted light such that the emitted light may be within a large emission cone. A diagram 1235 shows an example of the angular beam profile of the light emitted from diffusive quantum dot film 1230. In the example illustrated in diagram 1235, the peak intensity of the light beam emitted from diffusive quantum dot film 1230 may be in a direction with an azimuthal angle about 90° and a polar angle about 78°. Diffusive quantum dot film 1230 may have a thickness less than about 100 µm, less than about 80 µm, less than about 60 µm, or less than about 50 µm.

QDF-based BLU 1200 may include an optical efficiency enhancement film 1240 on top of diffusive quantum dot film 1230. Optical efficiency enhancement film 1240 may include micro-structures such as prisms, pyramids, negative pyramids, truncated pyramids, hemi-spheres, waffle, or a combination thereof, and may modify the beam profile (e.g., the peak intensity direction) of the light beam emitted from diffusive quantum dot film 1230. A diagram 1245 shows an example of the angular beam profile of the light emitted from optical efficiency enhancement film 1240. In the example illustrated in diagram 1245, the peak intensity of the light beam emitted from optical efficiency enhancement film 1240 may be in a direction with an azimuthal angle about 45° and a polar angle about 57°. Optical efficiency enhancement film 1240 may have a thickness less than about 100 µm or less than about 80 µm.

The angular beam profile of the light emitted from optical efficiency enhancement film 1240 may be further tuned by BEF 1250 and BEF 1260, which may be similar to bottom BEF 850 and top BEF 860 described above. BEF 1250 and BEF 1260 may each include a one-dimensional array of prisms, and may be oriented orthogonally with respect to each other, to tune the angular beam profile in both the x direction and the y direction. As described above with respect to top BEF 860, each of BEF 1250 and BEF 1260 may refract light within a certain emission cone (e.g., within about 35° with respect to the z direction), and may reflect most light outside the emission cone back towards ESR film 1212, such that the reflected light may be recycled until it exits BEF 1250 and BEF 1260 at angles within the emission cone or becomes stray light. A diagram 1255 shows an example of the angular beam profile of the light emitted from BEF 1250, and a diagram 1265 shows an example of the angular beam profile of the light emitted from BEF 1260. In the illustrated example, after passing through BEF 1250 and BEF 1260, the peak intensity of the light beam may be in the z direction, where the emission cone may be within about ±20° in the x-z plane and within about ±20° in the y-z plane.

QDF-based BLU 1200 may also include a reflective polarizer 1270 that may further improve the efficiency of QDF-based BLU 1200 by transmitting light of a polarization state that may be used by the LC panel and reflecting and recycling light of an orthogonal polarization state that may not be used by the LC panel. In some embodiments, reflective polarizer 1270 may be a film or solution that may be laminated on an LC panel. In some embodiments, reflective polarizer 1270 may be formed on another substrate (e.g., a polycarbonate substrate). A diagram 1275 shows an example of the angular beam profile of the light emitted from reflective polarizer 1270. In the illustrated example, after passing through reflective polarizer 1270, the peak intensity of the light beam may be in the z direction, where the emission cone may be within about ±25° in the x-z plane and within about ±25° in the y-z plane.

Figure 13B:
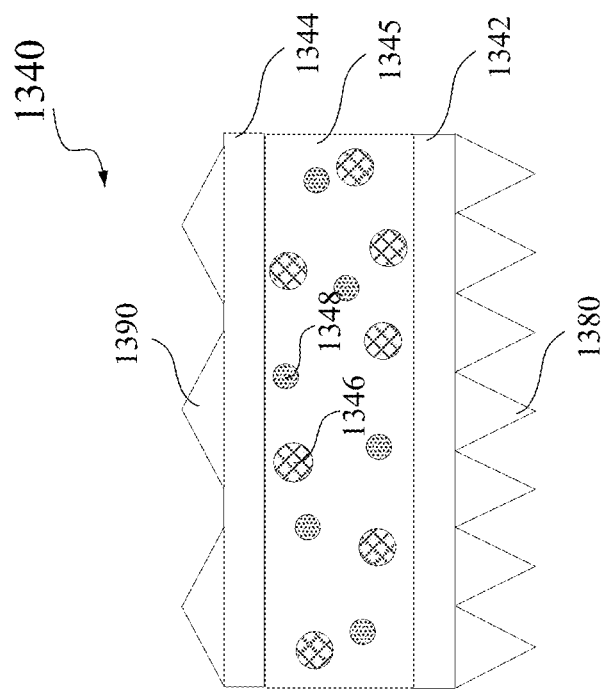
FIG. 13B illustrates an example of diffusive quantum dot film according to certain embodiments.
Figure 13A:
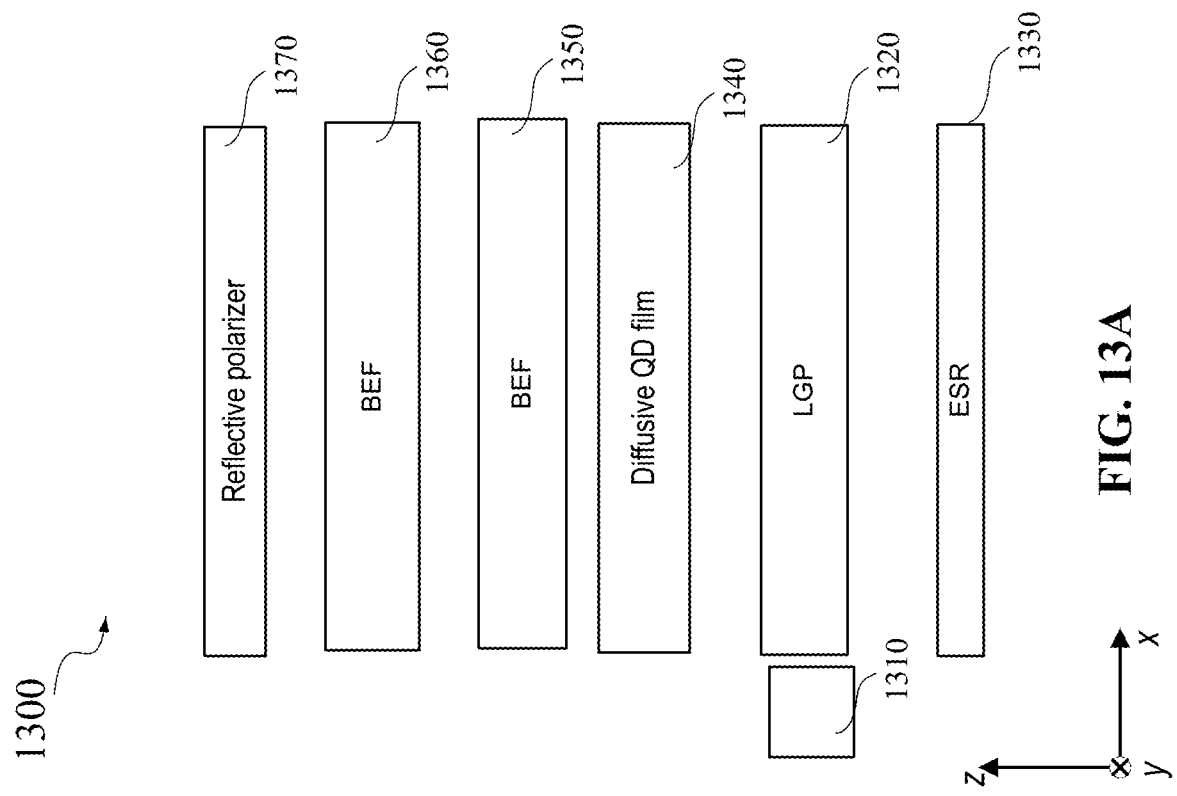
FIG. 13A illustrates another example of a QDF-based BLU including a QDF with an optical efficiency enhancement film formed thereon in an LCD panel according to certain embodiments.

FIG. 13A illustrates another example of a QDF-based BLU 1300 including a diffusive quantum dot film 1340 with an optical efficiency enhancement film formed thereon according to certain embodiments. QDF-based BLU 1300 may be similar to QDF-based BLU 1200, except that, in QDF-based BLU 1300, the optical efficiency enhancement film may be formed on diffusive quantum dot film 1340, which may reduce the total thickness of QDF-based BLU 1300. As illustrated, QDF-based BLU 1300 may include a light source 1310, an LGP 1320, and an ESR film 1330, which may be similar to light source 1210, LGP 1220, and ESR film 1212, respectively, and thus are not described in detail in this section. Diffusive quantum dot film 1340 may be similar to diffusive quantum dot film 1230 and may include micro-structures formed on one or two sides to tune the angular beam profile of the light emitted from diffusive quantum dot film 1340, such that the light after being further tuned (e.g., focused or collimated) by a bottom BEF 1350 (similar to, e.g., BEF 1250) and a top BEF 1360 (similar to, e.g., BEF 1260) may be in substantially the vertical direction with small divergence angles (e.g., ≤±35°, ≤±20°, or smaller). Reflective polarizer 1370 may be similar to reflective polarizer 1270, and thus is not descried I detail again in this section.

FIG. 13B illustrates an example of diffusive quantum dot film 1340 according to certain embodiments. In the illustrated example, diffusive quantum dot film 1340 may include a first barrier film 1342, a quantum dot matrix material layer 1345, and a second barrier film 1344. Quantum dot matrix material layer 1345 may include quantum dots 1346 and 1348 dispersed in a polymer material, such as polycarbonate (PC) and/or polyethylene terephthalate (PET). Quantum dots 1346 and 1348 may have different sizes and may absorb blue light and emit red and green light. In the example illustrated in FIG. 13B, an array of prisms 1380 may be formed on first barrier film 1342, and an array of micro-structures 1390 may be formed on second barrier film 1344. In some embodiments, micro-structures 1390 may include a waffle, pyramids, negative pyramids, truncated pyramids with polygonal cross-sections, hemi-spheres, and the like. In one example, quantum dot matrix material layer 1345 may have a thickness about 50 µm, first barrier film 1342 and second barrier film 1344 may each have a thickness about 5 µm, the array of prisms 1380 formed on first barrier film 1342 may have a thickness about 15 μm, and the array of micro-structures 1390 formed on second barrier film 1344 may have a thickness about 15 μm. First barrier film 1342, second barrier film 1344, the array of prisms 1380, and the array of micro-structures 1390 may be formed using UV-curable materials. For example, the array of prisms 1380 and the array of micro-structures 1390 may be formed by molding or nanoimprinting a UV-curable material and then curing the molded or imprinted UV-curable material.

The desired angular beam profile of the output light beam from the optical efficiency enhancement film (e.g., optical efficiency enhancement film 1240 or diffusive quantum dot film 1340) may be determined by the desired angular beam profile of the input light beam to the bottom BEF (e.g., BEF 1250 or bottom BEF 1350) in order to achieve substantially vertical light emission within a small emission cone at the output of top BEF 1360 and reflective polarizer 1370. The optical efficiency enhancement film can then be designed based on the desired angular beam profile of the input light beam to the bottom BEF, which may be determined by simulation or by measurement.

Figure 14B:
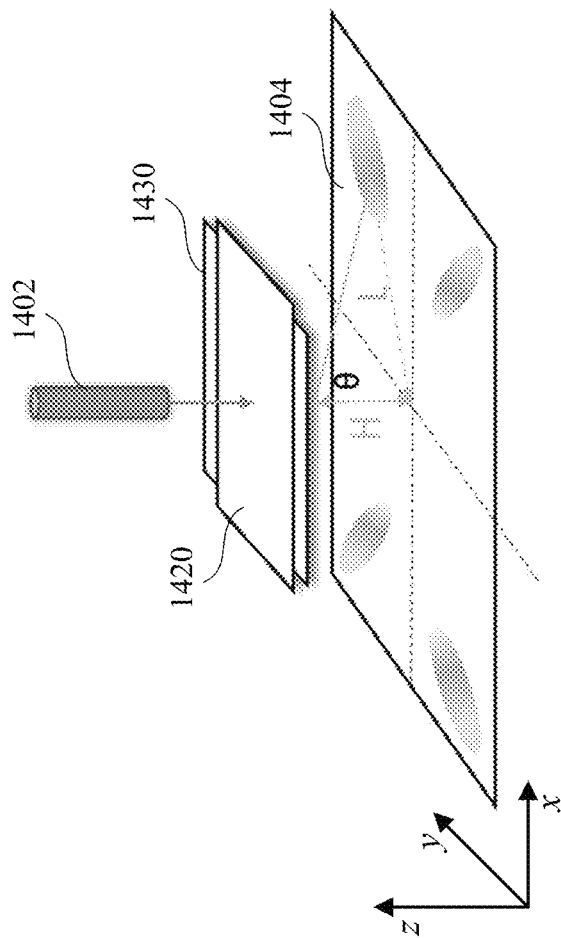
FIG. 14B illustrates an example of a setup for measuring the desired angular beam profile of the input light beam to BEFs.
Figure 14A:
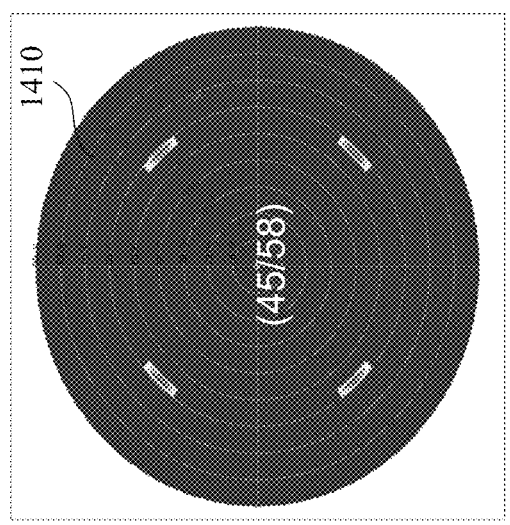
FIG. 14A includes a diagram illustrating simulation results of the desired angular beam profile of the output beam from an optical efficiency enhancement film in a QDF-based BLU for LCD display according to certain embodiments.

FIG. 14A includes a diagram 1410 illustrating simulation results of the desired angular beam profile of the output beam from the optical efficiency enhancement film (e.g., optical efficiency enhancement film 1240) in a QDF-based BLU for LCD display according to certain embodiments. The simulation results show that, when the peak intensity of the light beam emitted from optical efficiency enhancement film 1240 is in a direction with an azimuthal angle about 45° and a polar angle about 58°, the output beam from BEF 1260 may be in substantially the vertical (z) direction and the emission cone may be small.

FIG. 14B illustrates an example of a setup for measuring the desired angular beam profile of the input light beam to the BEFs. In the illustrated example, a collimated light beam 1402 may be vertically incident on two orthogonally oriented BEFs 1420 (e.g., the top BEF) and 1430 (e.g., the bottom BEF). The output beam from the two orthogonally oriented BEFs 1420 and 1430 may be measured on a screen 1404. The azimuthal angle of the output light beam may be determined based on the location of the light beam on screen 1404, and the polar angle of the output light beam may be determined based on the location of the light beam on screen 1404 and the distance between BEF 1430 and screen 1404.

According to the principle of reversibility of light, when the light beam incident on BEF 1430 from an optical efficiency enhancement film below BEF 1430 has the measured azimuthal angle and polar angle, the output beam from BEF 1420 may be a substantially collimated beam propagating in the vertical direction (the z direction). Therefore, the optical efficiency enhancement film may be designed such that the output beam from the optical efficiency enhancement film and incident on BEF 1430 may have the measured azimuthal angle and polar angle. As a result, the output beam from BEF 1420 may be a substantially collimated beam propagating in the vertical direction (the z direction), thereby improving the on-axis display efficiency of the LCD panel.

FIG. 15 illustrates performance of examples of LCD panels according to certain embodiments. The examples of LCD panels may have structures as shown in FIGS. 12-13B, and may include quantum dot films of different thicknesses (e.g., 80 μm or 130 μm) and different color filters (e.g., sRGB color filters or DCI-P3 color filters). The performance of an example of an LCD panel that uses white LEDs, no quantum dot film, and sRGB color filters is also shown as a reference. As shown in FIG. 15, BLUs including quantum dot films of different thicknesses (e.g., 80 μm or 130 μm) and optical efficiency enhancement films (e.g., optical efficiency enhancement film 1240) disclosed herein can generate light beams with full-width-half-magnitude (FWHM) angles about 40° in one direction and about 42° or 43° in an orthogonal direction, similar to the light beam generated by a BLU that uses white LEDs and has no quantum dot film.

FIG. 15 shows that the LCD panel using white LEDs, no quantum dot film, and sRGB color filters may only achieve about 75% coverage of the DCI-P3 gamut. In contrast, an LCD panel using blue LEDs, a 80-μm QDF, and sRGB color filters may achieve about 89% coverage of the DCI-P3 gamut, while an LCD panel using blue LEDs, a 130-μm QDF, and sRGB color filters may achieve about 84% coverage of the DCI-P3 gamut. When DCI-P3 color filters are used with the QDF-based BLUs disclosed herein, the LCD panels disclosed herein can achieve even higher coverage of the DCI-P3 gamut. For example, as shown in FIG. 15, the LCD panel using blue LEDs, a 80-μm QDF, and DCI-P3 color filters may achieve about 99% coverage of the DCI-P3 gamut, while the LCD panel using blue LEDs, a 130-μm QDF, and DCI-P3 color filters may achieve about 97.6% coverage of the DCI-P3 gamut. Therefore, the BLUs and LCD panels disclosed herein may achieve much wider color gamuts than existing BLUs and LCD panels.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

Figure 16:
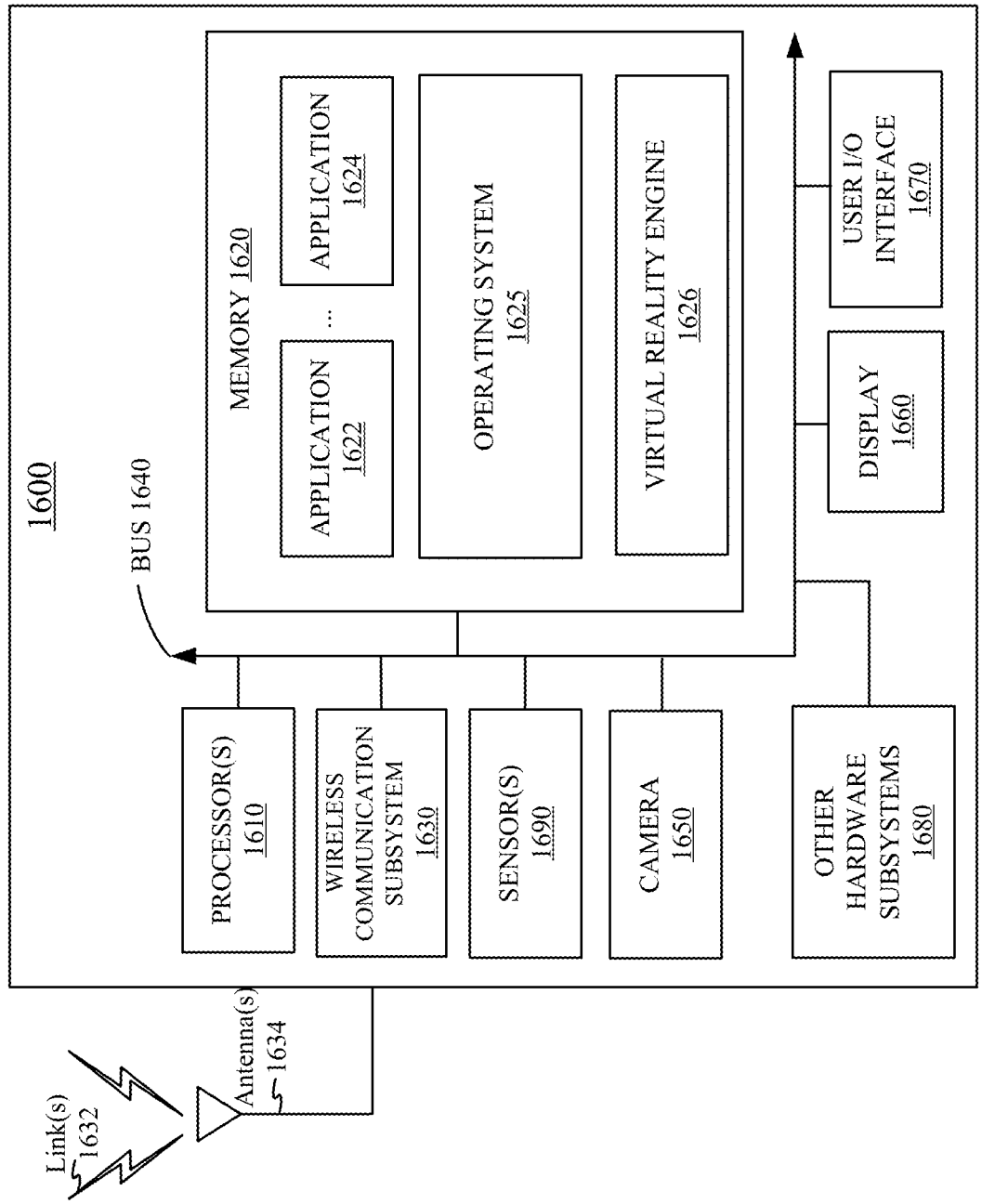
FIG. 16 illustrates an example of an electronic system of an example of a near-eye display for implementing some of the examples disclosed herein.

FIG. 16 is a simplified block diagram of an example of an electronic system 1600 of an example near-eye display (e.g., HMD device) for implementing some of the examples disclosed herein. Electronic system 1600 may be used as the electronic system of an HMD device or other near-eye displays described above. In this example, electronic system 1600 may include one or more processor(s) 1610 and a memory 1620. Processor(s) 1610 may be configured to execute instructions for performing operations at a number of components, and can be, for example, a general-purpose processor or microprocessor suitable for implementation within a portable electronic device. Processor(s) 1610 may be communicatively coupled with a plurality of components within electronic system 1600. To realize this communicative coupling, processor(s) 1610 may communicate with the other illustrated components across a bus 1640. Bus 1640 may be any subsystem adapted to transfer data within electronic system 1600. Bus 1640 may include a plurality of computer buses and additional circuitry to transfer data.

Memory 1620 may be coupled to processor(s) 1610. In some embodiments, memory 1620 may offer both short-term and long-term storage and may be divided into several units. Memory 1620 may be volatile, such as static random access memory (SRAM) and/or dynamic random access memory (DRAM) and/or non-volatile, such as read-only memory (ROM), flash memory, and the like. Furthermore, memory 1620 may include removable storage devices, such as secure digital (SD) cards. Memory 1620 may provide storage of computer-readable instructions, data structures, program code, and other data for electronic system 1600. In some embodiments, memory 1620 may be distributed into different hardware subsystems. A set of instructions and/or code might be stored on memory 1620. The instructions might take the form of executable code that may be executable by electronic system 1600, and/or might take the form of source and/or installable code, which, upon compilation and/or installation on electronic system 1600 (e.g., using any of a variety of generally available compilers, installation programs, compression/decompression utilities, etc.), may take the form of executable code.

In some embodiments, memory 1620 may store a plurality of applications 1622 through 1624, which may include any number of applications. Examples of applications may include gaming applications, conferencing applications, video playback applications, or other suitable applications. The applications may include a depth sensing function or eye tracking function. Applications 1622-1624 may include particular instructions to be executed by processor(s) 1610. In some embodiments, certain applications or parts of applications 1622-1624 may be executable by other hardware subsystems 1680. In certain embodiments, memory 1620 may additionally include secure memory, which may include additional security controls to prevent copying or other unauthorized access to secure information.

In some embodiments, memory 1620 may include an operating system 1625 loaded therein. Operating system 1625 may be operable to initiate the execution of the instructions provided by applications 1622-1624 and/or manage other hardware subsystems 1680 as well as interfaces with a wireless communication subsystem 1630 which may include one or more wireless transceivers. Operating system 1625 may be adapted to perform other operations across the components of electronic system 1600 including threading, resource management, data storage control and other similar functionality.

Wireless communication subsystem 1630 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1600 may include one or more antennas 1634 for wireless communication as part of wireless communication subsystem 1630 or as a separate component coupled to any portion of the system. Depending on desired functionality, wireless communication subsystem 1630 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1630 may permit data to be exchanged with a network, other computer systems, and/or any other devices described herein. Wireless communication subsystem 1630 may include a means for transmitting or receiving data, such as identifiers of HMD devices, position data, a geographic map, a heat map, photos, or videos, using antenna(s) 1634 and wireless link(s) 1632.

Embodiments of electronic system 1600 may also include one or more sensors 1690. Sensor(s) 1690 may include, for example, an image sensor, an accelerometer, a pressure sensor, a temperature sensor, a proximity sensor, a magnetometer, a gyroscope, an inertial sensor (e.g., a subsystem that combines an accelerometer and a gyroscope), an ambient light sensor, or any other similar devices or subsystems operable to provide sensory output and/or receive sensory input, such as a depth sensor or a position sensor. For example, in some implementations, sensor(s) 1690 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1600 may include a display 1660. Display 1660 may be a near-eye display, and may graphically present information, such as images, videos, and various instructions, from electronic system 1600 to a user. Such information may be derived from one or more applications 1622-1624, virtual reality engine 1626, one or more other hardware subsystems 1680, a combination thereof, or any other suitable means for resolving graphical content for the user (e.g., by operating system 1625). Display 1660 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 1600 may include a user input/output interface 1670. User input/output interface 1670 may allow a user to send action requests to electronic system 1600. An action request may be a request to perform a particular action. For example, an action request may be to start or end an application or to perform a particular action within the application. User input/output interface 1670 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1600. In some embodiments, user input/output interface 1670 may provide haptic feedback to the user in accordance with instructions received from electronic system 1600. For example, the haptic feedback may be provided when an action request is received or has been performed.

Electronic system 1600 may include a camera 1650 that may be used to take photos or videos of a user, for example, for tracking the user's eye position. Camera 1650 may also be used to take photos or videos of the environment, for example, for VR, AR, or MR applications. Camera 1650 may include, for example, a complementary metal-oxide-semiconductor (CMOS) image sensor with a few millions or tens of millions of pixels. In some implementations, camera 1650 may include two or more cameras that may be used to capture 3-D images.

In some embodiments, electronic system 1600 may include a plurality of other hardware subsystems 1680. Each of other hardware subsystems 1680 may be a physical subsystem within electronic system 1600. While each of other hardware subsystems 1680 may be permanently configured as a structure, some of other hardware subsystems 1680 may be temporarily configured to perform specific functions or temporarily activated. Examples of other hardware subsystems 1680 may include, for example, an audio output and/or input interface (e.g., a microphone or speaker), a near field communication (NFC) device, a rechargeable battery, a battery management system, a wired/wireless battery charging system, etc. In some embodiments, one or more functions of other hardware subsystems 1680 may be implemented in software.

In some embodiments, memory 1620 of electronic system 1600 may also store a virtual reality engine 1626. Virtual reality engine 1626 may execute applications within electronic system 1600 and receive position information, acceleration information, velocity information, predicted future positions, or some combination thereof of the HMD device from the various sensors. In some embodiments, the information received by virtual reality engine 1626 may be used for producing a signal (e.g., display instructions) to display 1660. For example, if the received information indicates that the user has looked to the left, virtual reality engine 1626 may generate content for the HMD device that mirrors the user's movement in a virtual environment. Additionally, virtual reality engine 1626 may perform an action within an application in response to an action request received from user input/output interface 1670 and provide feedback to the user. The provided feedback may be visual, audible, or haptic feedback. In some implementations, processor(s) 1610 may include one or more GPUs that may execute virtual reality engine 1626.

In various implementations, the above-described hardware and subsystems may be implemented on a single device or on multiple devices that can communicate with one another using wired or wireless connections. For example, in some implementations, some components or subsystems, such as GPUs, virtual reality engine 1626, and applications (e.g., tracking application), may be implemented on a console separate from the head-mounted display device. In some implementations, one console may be connected to or support more than one HMD.

In alternative configurations, different and/or additional components may be included in electronic system 1600. Similarly, functionality of one or more of the components can be distributed among the components in a manner different from the manner described above. For example, in some embodiments, electronic system 1600 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and" and "or," as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AC, BC, AA, ABC, AAB, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A liquid crystal display (LCD) panel comprising:
   a liquid crystal (LC) panel; and
   a backlight unit comprising:
      an array of blue light-emitting diodes (LEDs);
      a light guide plate configured to receive blue light from the array of blue LEDs, guide the blue light through total internal reflection, and couple portions of the blue light guided by the light guide plate out of the light guide plate;
      a quantum dot film including quantum dots configured to absorb blue light and emit red and green light, wherein the quantum dot film comprises microstructures configured to diffuse light on opposing sides of the quantum dot film;
      a brightness enhancement film configured to transmit incident light within an angular range and reflect incident light outside of the angular range, the brightness enhancement film including:
         a first brightness enhancement film oriented generally perpendicular to a second brightness enhancement film, and
         the first brightness enhancement film is positioned on the second brightness enhancement film such that a surface of the first brightness enhancement film is in direct contact with an additional surface of the second brightness enhancement film; and
      an optical efficiency enhancement film between the quantum dot film and the brightness enhancement film, the optical efficiency enhancement film configured to modify an angular beam profile of light from the quantum dot film such that: a peak intensity of light emitted from the optical efficiency enhancement film is in a direction with at least one of an azimuthal angle greater than 0° or a polar angle greater than 0°, and the light transmitted by the brightness enhancement film has a peak intensity in a direction perpendicular to the LC panel.

2. The LCD panel of claim 1, wherein the optical efficiency enhancement film includes prisms, pyramids, negative pyramids, truncated pyramids, hemi-spheres, waffle, or a combination thereof.

3. The LCD panel of claim 1, wherein the optical efficiency enhancement film includes prisms on one side and pyramids on an opposing side.

4. The LCD panel of claim 1, wherein the quantum dot film includes:
   a first barrier layer;
   a second barrier layer; and
   a quantum dot matrix material layer between the first barrier layer and the second barrier layer, the quantum dot matrix material layer including the quantum dots dispersed in a polymer matrix, wherein the microstructures comprise prisms on the first barrier layer and at least one of pyramids, negative pyramids, truncated pyramids, hemi-spheres, a waffle, or a combination thereof on the second barrier layer.

5. The LCD panel of claim 1, wherein the quantum dots include:
nanoparticles of a first size and configured to absorb blue light and emit red light; and
nanoparticles of a second size and configured to absorb blue light and emit green light.

6. The LCD panel of claim 1, wherein the micro-structures configured to diffuse light comprise particulates formed on the opposing sides of the quantum dot film.

7. The LCD panel of claim 1, wherein:
the backlight unit further comprises a reflector film;
the light guide plate is between the reflector film and the quantum dot film; and
the reflector film is configured to reflect incident light towards the light guide plate and the quantum dot film.

8. The LCD panel of claim 1, wherein the backlight unit further comprises a reflective polarizer between the LC panel and the brightness enhancement film, the reflective polarizer configured to transmit light of a first polarization state and reflect light of a second polarization state that is orthogonal to the first polarization state.

9. The LCD panel of claim 8, wherein the reflective polarizer is coupled to the LC panel.

10. The LCD panel of claim 1, wherein the array of blue LEDs is at an edge of the light guide plate.

11. The LCD panel of claim 1, wherein:
a thickness of the quantum dot film is less than 60 μm; and
a thickness of the optical efficiency enhancement film is less than 100 μm.

12. A liquid crystal display (LCD) panel comprising:
a liquid crystal (LC) panel; and
a backlight unit comprising:
an array of blue light-emitting diodes (LEDs);
a light guide plate configured to receive blue light from the array of blue LEDs, guide the blue light through total internal reflection, and couple portions of the blue light guided by the light guide plate out of the light guide plate;
a brightness enhancement film configured to transmit incident light within an angular range and reflect incident light outside of the angular range, the brightness enhancement film including:
a first brightness enhancement film oriented generally perpendicular to a second brightness enhancement film, and
the first brightness enhancement film is positioned on the second brightness enhancement film such that a surface of the first brightness enhancement film is in direct contact with an additional surface of the second brightness enhancement film; and
a hybrid film between the light guide plate and the brightness enhancement film, the hybrid film including:
a quantum dot film including quantum dots dispersed in a polymer matrix;
a first coating layer between the quantum dot film and the light guide plate and including an array of prisms; and
a second coating layer between the quantum dot film and the brightness enhancement film and including micro-structures configured to diffuse light,
wherein the first coating layer and the second coating layer are configured to tune an angular beam profile of light emitted from the hybrid film such that: a peak intensity of the light emitted from the hybrid film is in a direction with at least one of an azimuthal angle greater than 0° or a polar angle greater than 0°, and the light transmitted by the brightness enhancement film has a peak intensity in a direction perpendicular to the LC panel.

13. The LCD panel of claim 12, wherein the micro-structures include pyramids, negative pyramids, truncated pyramids, hemi-spheres, a waffle, or a combination thereof.

14. The LCD panel of claim 12, wherein the quantum dots include:
nanoparticles of a first size and configured to absorb blue light and emit red light; and
nanoparticles of a second size and configured to absorb blue light and emit green light.

15. The LCD panel of claim 12, wherein:
the backlight unit further comprises a reflector film;
the light guide plate is between the reflector film and the quantum dot film; and
the reflector film is configured to reflect incident light towards the light guide plate and the hybrid film.

16. The LCD panel of claim 12, wherein the backlight unit further comprises a reflective polarizer between the LC panel and the brightness enhancement film, the reflective polarizer configured to transmit light of a first polarization state and reflect light of a second polarization state that is orthogonal to the first polarization state.

17. The LCD panel of claim 12, wherein a thickness of the hybrid film is less than 100 μm.

18. The LCD panel of claim 12, wherein the LC panel is characterized by a resolution greater than 600 pixels per inch.

* * * * *